United States Patent
Rapaka et al.

(10) Patent No.: US 10,404,992 B2
(45) Date of Patent: Sep. 3, 2019

(54) METHODS AND SYSTEMS OF RESTRICTING BI-PREDICTION IN VIDEO CODING

(71) Applicant: QUALCOMM Incorporated, San Diego, CA (US)

(72) Inventors: Krishnakanth Rapaka, San Diego, CA (US); Rajan Laxman Joshi, San Diego, CA (US); Vadim Seregin, San Diego, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 142 days.

(21) Appl. No.: 15/219,159

(22) Filed: Jul. 25, 2016

(65) Prior Publication Data

US 2017/0034526 A1 Feb. 2, 2017

Related U.S. Application Data

(60) Provisional application No. 62/197,496, filed on Jul. 27, 2015.

(51) Int. Cl.
*H04N 19/00* (2014.01)
*H04N 19/513* (2014.01)
(Continued)

(52) U.S. Cl.
CPC ......... *H04N 19/513* (2014.11); *H04N 19/105* (2014.11); *H04N 19/127* (2014.11);
(Continued)

(58) Field of Classification Search
CPC ...... H04N 19/50; H04N 19/593; H04N 19/55; H04N 19/157; H04N 19/174; H04N 19/436; H04N 19/11
See application file for complete search history.

(56) References Cited

U.S. PATENT DOCUMENTS

2009/0290643 A1* 11/2009 Yang ............... H04N 19/597
375/240.16
2010/0266042 A1* 10/2010 Koo ................. H04N 19/597
375/240.16

(Continued)

OTHER PUBLICATIONS

Chuang T D., et al., "CE2-related: Intra Block Copy Searching Constraints for Reducing Worst Case Bandwidth", 21. JCT-VC meeting, Jun. 19, 2015-Jun. 26, 2015, Warsaw, (Joint Collaborative Team on Video Coding of ISO/IEC JTC1/SC29/WG11 and ITU-T SG.16), URL: http://wftp3.itu.int/AV-ARCH/JCTVC-SITE/, No. JCTVC-U0065, Jun. 10, 2015 (Jun. 10, 2015), XP030117486.

(Continued)

*Primary Examiner* — Frank F Huang

(74) *Attorney, Agent, or Firm* — Kilpatrick Townsend & Stockton, LLP

(57) ABSTRACT

Techniques and systems are provided for encoding video data. For example, restrictions on certain prediction modes can be applied for video coding. A restriction can be imposed that prevents inter-prediction bi-prediction from being performed on video data when certain conditions are met. For example, bi-prediction restriction can be based on whether intra-block copy prediction is enabled for one or more coding units or blocks of the video data, whether a value of a syntax element indicates that one or more motion vectors are in non-integer accuracy, whether both motion vectors of a bi-prediction block are in non-integer accuracy, whether the motion vectors of a bi-prediction block are not identical and/or are not from the same reference index, or any combination thereof. If one or more of these conditions are met, the restriction on bi-prediction can be applied, preventing bi-prediction from being performed on certain coding units or blocks.

42 Claims, 8 Drawing Sheets

(51) Int. Cl.
    *H04N 19/159*     (2014.01)
    *H04N 19/174*     (2014.01)
    *H04N 19/105*     (2014.01)
    *H04N 19/176*     (2014.01)
    *H04N 19/593*     (2014.01)
    *H04N 19/127*     (2014.01)

(52) U.S. Cl.
    CPC ......... *H04N 19/159* (2014.11); *H04N 19/174* (2014.11); *H04N 19/176* (2014.11); *H04N 19/593* (2014.11)

(56) References Cited

U.S. PATENT DOCUMENTS

| | | | | |
|---|---|---|---|---|
| 2013/0229485 | A1* | 9/2013 | Rusanovskyy | H04N 13/0048 348/43 |
| 2015/0312545 | A1* | 10/2015 | Xu | H04N 19/597 348/43 |
| 2016/0105682 | A1* | 4/2016 | Rapaka | H04N 19/44 375/240.12 |

OTHER PUBLICATIONS

International Search Report and Written Opinion—PCT/US2016/043978—ISA/EPO—dated Oct. 4, 2016.

Li B., et al., "Adaptive Motion Vector Resolution for Screen Content," 19. JCT-VC Meeting; Oct. 17, 2014 Oct. 24, 2014; Strasbourg; (Joint Collaborative Team on Video Coding of ISO/IEC 1Tri/cr29/Wa11 ANn TTII-T cn16 ); URL: http://wftp3.itu.int/av-arch/jctvc-site/,, No. JCTVC-S0085-v3, Oct. 23, 2014 (Oct. 23, 2014), XP030116828, 14 pages.

Rapaka K., et al., "CE2 :Test 5 on Intra Block Copy Constraints on Prediction", 21. JCT-VC meeting, Jun. 19, 2015-Jun. 26, 2015, Warsaw, (Joint Collaborative Team on Video Coding of ISO/IEC JTC1/SC29/WG11 and ITU-T SG.16) URL: http://wftp3.itu.int/AV-ARCH/JCTVC-SITE/, No. JCTVC-U0078, Jun. 10, 2015 (Jun. 10, 2015), XP030117502.

Rapaka K., et al., "On Bi-prediction Restriction when Intra Block Copy is Enabled," 22, JCT-VC Meeting; Oct. 15, 2015 Oct. 21, 2015; Geneva; (Joint Collaborative Team on Video Coding of ISO/IEC JTC1/SC29/WG11 and ITU-T SG.16 ); URL: http://wftp3.itu.int/av-arch/jctvc-site/,, No. JCTVC-V0048, Oct. 6, 2015 (Oct. 6, 2015), XP030117697, 3 pages.

* cited by examiner

500

```
┌─────────────────────────────────────┐
│ RECEIVE, IN A VIDEO BITSTREAM, ENCODED │
│ VIDEO DATA ENCODED USING A PLURALITY OF │
│   PREDICTION MODES, THE PLURALITY OF │
│  PREDICTION MODES COMPRISING AN INTER- │
│   PICTURE UNI-PREDICTION MODE, AN INTER- │
│  PICTURE BI-PREDICTION MODE, AND AN INTRA- │
│     PICTURE INTRA-BLOCK COPY MODE   │
│                 502                 │
└─────────────────────────────────────┘
                  │
                  ▼
┌─────────────────────────────────────┐
│   RECEIVE, IN THE VIDEO BITSTREAM, AN │
│ INDICATION THAT INTER-PICTURE BI-PREDICTION │
│  IS DISABLED FOR ONE OR MORE BLOCKS OF THE │
│  ENCODED VIDEO DATA, WHEREIN INTER-PICTURE │
│   BI-PREDICTION IS DISABLED BASED ON INTRA- │
│   BLOCK COPY BEING ENABLED FOR THE ONE OR │
│    MORE BLOCKS OF THE ENCODED VIDEO DATA │
│  AND BOTH MOTION VECTORS OF A BI-PREDICTION │
│   BLOCK OF THE ENCODED VIDEO DATA BEING IN │
│          NON-INTEGER ACCURACY       │
│                 504                 │
└─────────────────────────────────────┘
                  │
                  ▼
┌─────────────────────────────────────┐
│  DETERMINE, BASED ON THE INDICATION, A │
│   PREDICTION MODE FROM THE PLURALITY OF │
│  PREDICTION MODES FOR PREDICTING A BLOCK │
│       OF THE ENCODED VIDEO DATA     │
│                 506                 │
└─────────────────────────────────────┘
                  │
                  ▼
┌─────────────────────────────────────┐
│   DECODE THE BLOCK OF THE ENCODED VIDEO │
│  DATA USING THE DETERMINED PREDICTION MODE │
│                 508                 │
└─────────────────────────────────────┘
```

602 RECEIVE, IN A VIDEO BITSTREAM, ENCODED VIDEO DATA ENCODED USING A PLURALITY OF PREDICTION MODES, THE PLURALITY OF PREDICTION MODES COMPRISING AN INTER-PICTURE UNI-PREDICTION MODE, AN INTER-PICTURE BI-PREDICTION MODE, AND AN INTRA-PICTURE INTRA-BLOCK COPY MODE

604 RECEIVE, IN THE VIDEO BITSTREAM, AN INDICATION THAT INTER-PICTURE BI-PREDICTION IS DISABLED FOR ONE OR MORE BLOCKS OF THE ENCODED VIDEO DATA, WHEREIN INTER-PICTURE BI-PREDICTION IS DISABLED BASED ON INTRA-BLOCK COPY BEING ENABLED FOR THE ONE OR MORE BLOCKS OF THE ENCODED VIDEO DATA AND BOTH MOTION VECTORS OF THE BI-PREDICTION BLOCK NOT BEING IDENTICAL OR NOT POINTING TO A SAME REFERENCE PICTURE

606 DETERMINE, BASED ON THE INDICATION, A PREDICTION MODE FROM THE PLURALITY OF PREDICTION MODES FOR PREDICTING A BLOCK OF THE ENCODED VIDEO DATA

608 DECODE THE BLOCK OF THE ENCODED VIDEO DATA USING THE DETERMINED PREDICTION MODE

FIG. 6

METHODS AND SYSTEMS OF RESTRICTING BI-PREDICTION IN VIDEO CODING

CROSS-REFERENCE TO RELATED APPLICATIONS

This application claims the benefit of U.S. Provisional Application No. 62/197,496, filed Jul. 27, 2015, which is hereby incorporated by reference, in its entirety for all purposes.

FIELD

The present disclosure generally relates to video coding and compression, and more specifically to techniques and systems for restricting bi-prediction in video coding.

BACKGROUND

Many devices and systems allow video data to be processed and output for consumption. Digital video data includes large amounts of data to meet the demands of consumers and video providers. For example, consumers of video data desire video of the utmost quality, with high fidelity, resolutions, frame rates, and the like. As a result, the large amount of video data that is required to meet these demands places a burden on communication networks and devices that process and store the video data.

Various video coding techniques may be used to compress video data. Video coding is performed according to one or more video coding standards. For example, video coding standards include high-efficiency video coding (HEVC), advanced video coding (AVC), moving picture experts group (MPEG) coding, or the like. Video coding generally utilizes prediction methods (e.g., inter-prediction, intra-prediction, or the like) that take advantage of redundancy present in video images or sequences. An important goal of video coding techniques is to compress video data into a form that uses a lower bit rate, while avoiding or minimizing degradations to video quality. With ever-evolving video services becoming available, encoding techniques with better coding efficiency are needed.

BRIEF SUMMARY

In some implementations, techniques and systems are described that provide restrictions on certain prediction modes for video coding. In some examples, a restriction can be imposed that prevents inter-prediction bi-prediction from being performed on video data when certain conditions are met. For example, the bi-prediction restriction can be based on whether intra-block copy prediction is enabled for one or more coding units or blocks of the video data. In such an example, bi-prediction can be disabled for certain coding units or blocks when intra-block copy prediction is enabled.

In some examples, in addition to intra-block copy prediction being enabled, other conditions can also be required for the bi-prediction restriction to apply. For example, other conditions can include a syntax element having a value indicating (e.g., for a slice, for a coding unit, or the like) that one or more motion vectors are in non-integer accuracy (e.g., a fractional motion vector), both motion vectors of bi-prediction block being in non-integer accuracy, the motion vectors of a bi-prediction block not being identical and/or not pointing to the same reference picture, or any combination thereof. If one or more of these conditions are met, the restriction on bi-prediction can be applied, preventing bi-prediction from being performed on certain coding units or blocks.

According to at least one example, a method of encoding video data to generate a one or more encoded video pictures is provided that comprises obtaining video data at an encoder, and determining intra-block copy prediction is enabled for performing intra-picture prediction on at least one block of the video data. The method further comprises determining both motion vectors of a bi-prediction block of the video data are in non-integer accuracy. The method further comprises disabling inter-picture bi-prediction for encoding one or more blocks of the video data. The inter-prediction bi-prediction is disabled in response to determining the intra-block copy prediction is enabled and determining both motion vectors of the bi-prediction block are in non-integer accuracy. The method further comprises generating the one or more encoded video pictures using a prediction mode.

In another example, an apparatus is provided that includes a memory configured to store video data and a processor. The processor is configured to and can obtain video data at an encoder, and determine intra-block copy prediction is enabled for performing intra-picture prediction on at least one block of the video data. The processor is further configured to and can determine both motion vectors of a bi-prediction block of the video data are in non-integer accuracy. The processor is further configured to and can disable inter-picture bi-prediction for encoding one or more blocks of the video data. The inter-prediction bi-prediction is disabled in response to determining the intra-block copy prediction is enabled and determining both motion vectors of the bi-prediction block are in non-integer accuracy. The processor is further configured to and can generate one or more encoded video pictures using a prediction mode.

In another example, a computer readable medium is provided having stored thereon instructions that when executed by a processor perform a method that includes: obtaining video data at an encoder; determining intra-block copy prediction is enabled for performing intra-picture prediction on at least one block of the video data; determining both motion vectors of a bi-prediction block of the video data are in non-integer accuracy; disabling inter-picture bi-prediction for encoding one or more blocks of the video data, wherein the inter-prediction bi-prediction is disabled in response to determining the intra-block copy prediction is enabled and determining both motion vectors of the bi-prediction block are in non-integer accuracy; and generate the one or more encoded video pictures using a prediction mode.

In another example, an apparatus is provided that includes means for obtaining video data at an encoder and means for determining intra-block copy prediction is enabled for performing intra-picture prediction on at least one block of the video data. The apparatus further comprises means for determining both motion vectors of a bi-prediction block of the video data are in non-integer accuracy. The apparatus further comprises means for disabling inter-picture bi-prediction for encoding one or more blocks of the video data. The inter-prediction bi-prediction is disabled in response to determining the intra-block copy prediction is enabled and determining both motion vectors of the bi-prediction block are in non-integer accuracy. The apparatus further comprises means for generating one or more encoded video pictures using a prediction mode.

In some aspects, the method, apparatuses, and computer readable medium described above for encoding video data may further comprise: determining both motion vectors of the bi-prediction block are not identical or are not pointing to a same reference picture; and wherein disabling includes disabling the inter-picture bi-prediction for encoding the one or more blocks of the video data in response to determining the intra-picture prediction is enabled, determining both motion vectors of the bi-prediction block are in non-integer accuracy, and determining both motion vectors of the bi-prediction block are not identical or are not pointing to the same reference picture.

In some aspects, the method, apparatuses, and computer readable medium described above for encoding video data may further comprise: determining a value of a motion vector resolution flag is equal to zero, the motion vector resolution flag specifying a resolution of motion vectors used for an inter-prediction mode; and wherein disabling includes disabling the inter-picture bi-prediction for encoding the one or more blocks of the video data in response to determining the intra-picture prediction is enabled, determining both motion vectors of the bi-prediction block are in non-integer accuracy, and determining the value of the motion vector resolution flag is equal to zero.

In some aspects, the video data comprises a slice of a picture, the slice includes a plurality of blocks, and the disabling includes disabling the inter-picture bi-prediction for encoding the plurality of blocks of the slice.

In some aspects, the bi-prediction block includes an 8×8 bi-prediction block.

In some aspects, the inter-picture bi-prediction is disabled for encoding prediction blocks that are less than a threshold size. In some examples, the threshold size includes a prediction block size of 8×8 pixels.

According to at least one other example, another method of encoding video data to generate a one or more encoded video pictures is provided that comprises obtaining video data at an encoder, and determining intra-block copy prediction is enabled for performing intra-picture prediction on at least one block of the video data. The method further comprises determining both motion vectors of a bi-prediction block of the video data are not identical or are not pointing to a same reference picture. The method further comprises disabling inter-picture bi-prediction for encoding one or more blocks of the video data. The inter-prediction bi-prediction is disabled in response to determining the intra-block copy prediction is enabled and determining both motion vectors of the bi-prediction block are not identical or are not pointing to the same reference picture. The method further comprises generating the one or more encoded video pictures using a prediction mode.

In another example, an apparatus is provided that includes a memory configured to store video data and a processor. The processor is configured to and can obtain video data at an encoder, and determine intra-block copy prediction is enabled for performing intra-picture prediction on at least one block of the video data. The processor is further configured to and can determine both motion vectors of a bi-prediction block of the video data are not identical or are not pointing to a same reference picture. The processor is further configured to and can disable inter-picture bi-prediction for encoding one or more blocks of the video data. The inter-prediction bi-prediction is disabled in response to determining the intra-block copy prediction is enabled and determining both motion vectors of the bi-prediction block are not identical or are not pointing to the same reference picture. The processor is further configured to and can generating one or more encoded video pictures using a prediction mode.

In another example, a computer readable medium is provided having stored thereon instructions that when executed by a processor perform a method that includes: obtaining video data at an encoder; determining intra-block copy prediction is enabled for performing intra-picture prediction on at least one block of the video data; determining both motion vectors of a bi-prediction block of the video data are not identical or are not pointing to a same reference picture; disabling inter-picture bi-prediction for encoding one or more blocks of the video data, wherein inter-prediction bi-prediction is disabled in response to determining the intra-block copy prediction is enabled and determining both motion vectors of the bi-prediction block are not identical or are not pointing to the same reference picture; and generating one or more encoded video pictures using a prediction mode.

In another example, an apparatus is provided that includes means for obtaining video data at an encoder and means for determining intra-block copy prediction is enabled for performing intra-picture prediction on at least one block of the video data. The apparatus further comprises means for determining both motion vectors of a bi-prediction block of the video data are not identical or are not pointing to a same reference picture. The apparatus further comprises means for disabling inter-picture bi-prediction for encoding one or more blocks of the video data. The inter-prediction bi-prediction is disabled in response to determining the intra-block copy prediction is enabled and determining both motion vectors of the bi-prediction block are not identical or are not pointing to the same reference picture. The apparatus further comprises means for generating one or more encoded video pictures using a prediction mode.

In some aspects, the other method, apparatuses, and computer readable medium described above for encoding video data may further comprise: determining both motion vectors of the bi-prediction block are in non-integer accuracy; and wherein disabling includes disabling the inter-picture bi-prediction for encoding the one or more blocks of the video data in response to determining the intra-picture prediction is enabled, determining both motion vectors of the bi-prediction block are not identical or are not pointing to the same reference picture, and determining both motion vectors of the bi-prediction block are in non-integer accuracy.

In some aspects, the other method, apparatuses, and computer readable medium described above for encoding video data may further comprise: determining a value of a motion vector resolution flag is equal to zero, the motion vector resolution flag specifying a resolution of motion vectors used for an inter-prediction mode; and wherein disabling includes disabling the inter-picture bi-prediction for encoding the one or more blocks of the video data in response to determining the intra-picture prediction is enabled, determining both motion vectors of the bi-prediction block are not identical or are not pointing to the same reference picture, and determining the value of the motion vector resolution flag is equal to zero.

In some aspects, the video data comprises a slice of a picture, the slice includes a plurality of blocks, and the disabling includes disabling the inter-picture bi-prediction for encoding the plurality of blocks of the slice.

In some aspects, the bi-prediction block includes an 8×8 bi-prediction block.

In some aspects, the inter-picture bi-prediction is disabled for encoding prediction blocks that are less than a threshold size. In some examples, the threshold size includes a prediction block size of 8×8 pixels.

According to at least one other example, a method of decoding video data to generate one or more decoded video pictures is provided that comprises receiving, in a video bitstream, encoded video data encoded using a plurality of prediction modes. The plurality of prediction modes comprise an inter-picture uni-prediction mode, an inter-picture bi-prediction mode, and an intra-picture intra-block copy mode. The method further comprises receiving, in the video bitstream, an indication that inter-picture bi-prediction is disabled for one or more blocks of the encoded video data. Inter-picture bi-prediction is disabled based on intra-block copy being enabled for the one or more blocks of the encoded video data and both motion vectors of a bi-prediction block of the encoded video data being in non-integer accuracy. The method further comprises determining, based on the indication, a prediction mode from the plurality of prediction modes for predicting a block of the encoded video data. The method further comprises decoding the block of the encoded video data using the determined prediction mode.

In another example, an apparatus is provided that includes a memory configured to store video data and a processor. The processor is configured to and can receive, in a video bitstream, encoded video data encoded using a plurality of prediction modes. The plurality of prediction modes comprise an inter-picture uni-prediction mode, an inter-picture bi-prediction mode, and an intra-picture intra-block copy mode. The processor is further configured to and can receive, in the video bitstream, an indication that inter-picture bi-prediction is disabled for one or more blocks of the encoded video data. Inter-picture bi-prediction is disabled based on intra-block copy being enabled for the one or more blocks of the encoded video data and both motion vectors of a bi-prediction block of the encoded video data being in non-integer accuracy. The processor is further configured to and can determine, based on the indication, a prediction mode from the plurality of prediction modes for predicting a block of the encoded video data. The processor is further configured to and can decode the block of the encoded video data using the determined prediction mode.

In another example, a computer readable medium is provided having stored thereon instructions that when executed by a processor perform a method that includes: receiving, in a video bitstream, encoded video data encoded using a plurality of prediction modes, the plurality of prediction modes comprising an inter-picture uni-prediction mode, an inter-picture bi-prediction mode, and an intra-picture intra-block copy mode; receiving, in the video bitstream, an indication that inter-picture bi-prediction is disabled for one or more blocks of the encoded video data, wherein inter-picture bi-prediction is disabled based on intra-block copy being enabled for the one or more blocks of the encoded video data and both motion vectors of a bi-prediction block of the encoded video data being in non-integer accuracy; determining, based on the indication, a prediction mode from the plurality of prediction modes for predicting a block of the encoded video data; and decoding the block of the encoded video data using the determined prediction mode.

In another example, an apparatus is provided that includes means for receiving, in a video bitstream, encoded video data encoded using a plurality of prediction modes. The plurality of prediction modes comprise an inter-picture uni-prediction mode, an inter-picture bi-prediction mode, and an intra-picture intra-block copy mode. The apparatus further comprises means for receiving, in the video bitstream, an indication that inter-picture bi-prediction is disabled for one or more blocks of the encoded video data. Inter-picture bi-prediction is disabled based on intra-block copy being enabled for the one or more blocks of the encoded video data and both motion vectors of a bi-prediction block of the encoded video data being in non-integer accuracy. The apparatus further comprises means for determining, based on the indication, a prediction mode from the plurality of prediction modes for predicting a block of the encoded video data. The apparatus further comprises means for decoding the block of the encoded video data using the determined prediction mode.

In some aspects, the inter-picture bi-prediction is disabled based on intra-block copy being enabled for the one or more blocks of the encoded video data, both motion vectors of a bi-prediction block of the encoded video data being in non-integer accuracy, and both motion vectors of the bi-prediction block not being identical or not pointing to a same reference picture.

In some aspects, the inter-picture bi-prediction is disabled based on intra-block copy being enabled for the one or more blocks of the encoded video data, both motion vectors of a bi-prediction block of the encoded video data being in non-integer accuracy, and a value of a motion vector resolution flag being equal to zero, the motion vector resolution flag specifying a resolution of motion vectors used for an inter-prediction mode.

In some aspects, the encoded video data comprises a slice of a picture, the slice includes a plurality of blocks, and the inter-prediction bi-prediction is disabled for decoding the plurality of blocks of the slice.

In some aspects, the bi-prediction block includes an 8×8 bi-prediction block.

In some aspects, the inter-picture bi-prediction is disabled for decoding prediction blocks that are less than a threshold size. In some examples, the threshold size includes a prediction block size of 8×8 pixels.

According to at least one other example, another method of decoding video data to generate one or more decoded video pictures is provided that comprises receiving, in a video bitstream, encoded video data encoded using a plurality of prediction modes. The plurality of prediction modes comprise an inter-picture uni-prediction mode, an inter-picture bi-prediction mode, and an intra-picture intra-block copy mode. The method further comprises receiving, in the video bitstream, an indication that inter-picture bi-prediction is disabled for one or more blocks of the encoded video data. Inter-picture bi-prediction is disabled based on intra-block copy being enabled for the one or more blocks of the encoded video data and both motion vectors of a bi-prediction block not being identical or not pointing to the same reference picture. The method further comprises determining, based on the indication, a prediction mode from the plurality of prediction modes for predicting a block of the encoded video data. The method further comprises decoding the block of the encoded video data using the determined prediction mode.

In another example, an apparatus is provided that includes a memory configured to store video data and a processor. The processor is configured to and can receive, in a video bitstream, encoded video data encoded using a plurality of prediction modes. The plurality of prediction modes comprise an inter-picture uni-prediction mode, an inter-picture bi-prediction mode, and an intra-picture intra-block copy mode. The processor is further configured to and can receive, in the video bitstream, an indication that inter-picture bi-prediction is disabled for one or more blocks of the encoded video data. Inter-picture bi-prediction is disabled based on intra-block copy being enabled for the one or more blocks of the encoded video data and both motion vectors of a bi-prediction block not being identical or not pointing to the same reference picture. The processor is further configured to and can determine, based on the indication, a prediction mode from the plurality of prediction modes for predicting a block of the encoded video data. The processor is further configured to and can decode the block of the encoded video data using the determined prediction mode.

In another example, a computer readable medium is provided having stored thereon instructions that when executed by a processor perform a method that includes: receiving, in a video bitstream, encoded video data encoded using a plurality of prediction modes, the plurality of prediction modes comprising an inter-picture uni-prediction mode, an inter-picture bi-prediction mode, and an intra-picture intra-block copy mode; receiving, in the video bitstream, an indication that inter-picture bi-prediction is disabled for one or more blocks of the encoded video data, wherein inter-picture bi-prediction is disabled based on intra-block copy being enabled for the one or more blocks of the encoded video data and both motion vectors of a bi-prediction block not being identical or not pointing to the same reference picture; determining, based on the indication, a prediction mode from the plurality of prediction modes for predicting a block of the encoded video data; and decoding the block of the encoded video data using the determined prediction mode.

In another example, an apparatus is provided that includes means for receiving, in a video bitstream, encoded video data encoded using a plurality of prediction modes. The plurality of prediction modes comprise an inter-picture uni-prediction mode, an inter-picture bi-prediction mode, and an intra-picture intra-block copy mode. The apparatus further comprises means for receiving, in the video bitstream, an indication that inter-picture bi-prediction is disabled for one or more blocks of the encoded video data. Inter-picture bi-prediction is disabled based on intra-block copy being enabled for the one or more blocks of the encoded video data and both motion vectors of a bi-prediction block not being identical or not pointing to the same reference picture. The apparatus further comprises means for determining, based on the indication, a prediction mode from the plurality of prediction modes for predicting a block of the encoded video data. The apparatus further comprises means for decoding the block of the encoded video data using the determined prediction mode.

In some aspects, the inter-picture bi-prediction is disabled based on intra-block copy being enabled for the one or more blocks of the encoded video data, both motion vectors of a bi-prediction block not being identical or not pointing to the same reference picture, and both motion vectors of the bi-prediction block being in non-integer accuracy.

In some aspects, the inter-picture bi-prediction is disabled based on intra-block copy being enabled for the one or more blocks of the encoded video data, both motion vectors of a bi-prediction block not being identical or not pointing to the same reference picture, and a value of a motion vector resolution flag being equal to zero, the motion vector resolution flag specifying a resolution of motion vectors used for an inter-prediction mode.

In some aspects, the video data comprises a slice of a picture, the slice includes a plurality of blocks, and the inter-prediction bi-prediction is disabled for decoding the plurality of blocks of the slice.

In some aspects, the bi-prediction block includes an 8×8 bi-prediction block.

In some aspects, the inter-picture bi-prediction is disabled for decoding prediction blocks that are less than a threshold size. In some examples, the threshold size includes a prediction block size of 8×8 pixels.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present invention are described in detail below with reference to the following drawing figures:

FIG. 5 illustrates an example of a process of decoding video data.

FIG. 6 illustrates another example of a process of decoding video data.

DETAILED DESCRIPTION

Figure 1:
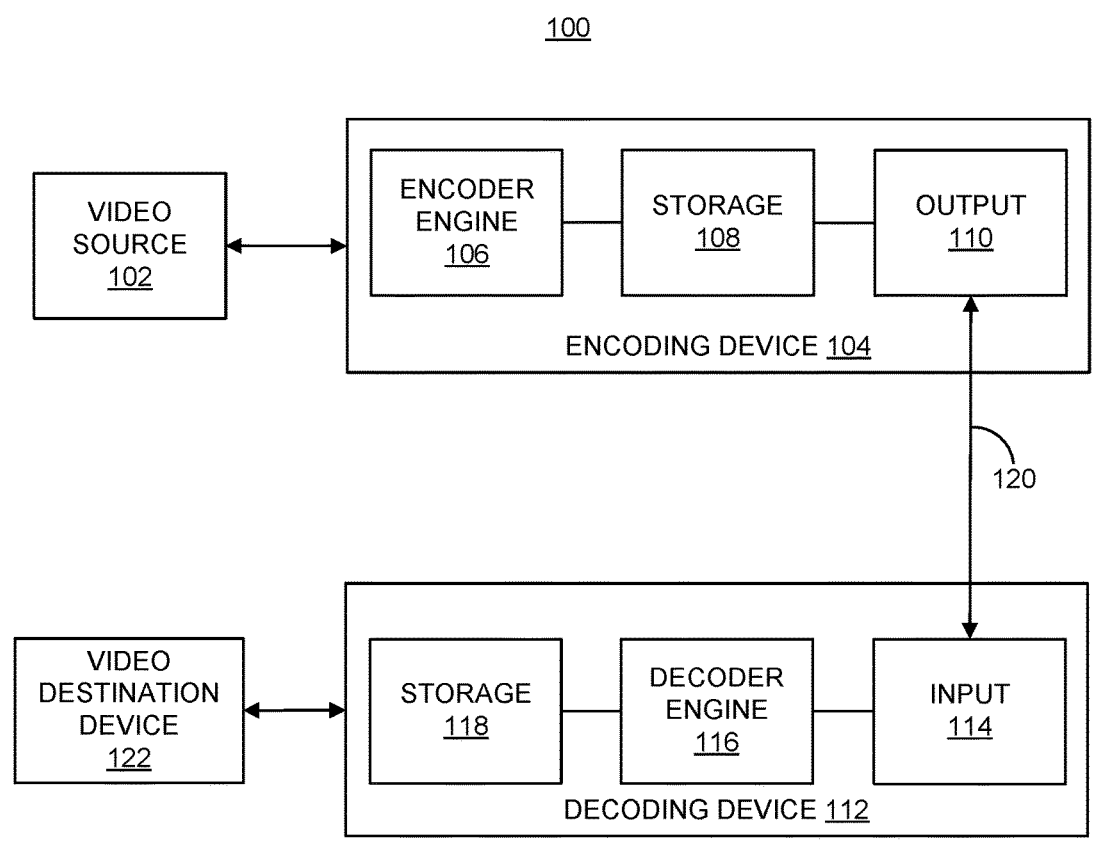
FIG. 1 is a block diagram illustrating an example of an encoding device and a decoding device, in accordance with some embodiments.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

As more devices and systems provide consumers with the ability to consume digital video data, the need for efficient video coding techniques becomes more important. Video coding is needed to reduce storage and transmission requirements necessary to handle the large amounts of data present in digital video data. Various video coding techniques may be used to compress video data into a form that uses a lower bit rate while maintaining high video quality.

Several systems and methods of video coding using video encoders, decoders, and other coding processing devices are described herein. In some examples, one or more systems and methods of video coding are described for restricting certain prediction modes. For example, a restriction can be imposed that prevents inter-prediction bi-prediction from being performed on video data when certain conditions are met. Further details regarding the bi-prediction restriction are provided below.

FIG. 1 is a block diagram illustrating an example of a system 100 including an encoding device 104 and a decoding device 112. The encoding device 104 may be part of a source device, and the decoding device 112 may be part of a receiving device. The source device and/or the receiving device may include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the source device and the receiving device may include one or more wireless transceivers for wireless communications. The coding techniques described herein are applicable to video coding in various multimedia applications, including streaming video transmissions (e.g., over the Internet), television broadcasts or transmissions, encoding of digital video for storage on a data storage medium, decoding of digital video stored on a data storage medium, or other applications. In some examples, system 100 can support one-way or two-way video transmission to support applications such as video conferencing, video streaming, video playback, video broadcasting, gaming, and/or video telephony.

The encoding device 104 (or encoder) can be used to encode video data using a video coding standard or protocol to generate an encoded video bitstream. Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. A more recent video coding standard, High-Efficiency Video Coding (HEVC), has been finalized by the Joint Collaboration Team on Video Coding (JCT-VC) of ITU-T Video Coding Experts Group (VCEG) and ISO/IEC Moving Picture Experts Group (MPEG). Various extensions to HEVC deal with multi-layer video coding and are also being developed by the JCT-VC, including the multiview extension to HEVC, called MV-HEVC, and the scalable extension to HEVC, called SHVC, or any other suitable coding protocol. The Range Extensions to HEVC, namely HEVC-Rext, is also being developed by the JCT-VC (e.g., the recent Working Draft (WD) of Range extensions referred to as RExt WD7).

The HEVC specification text (e.g., as in JCTVC-Q1003) may be referred to herein as HEVC version 1 (or a first version of HEVC). The range extension specification may be referred to as a version 2 of the HEVC (or a second version of HEVC). However, as far as the proposed techniques are concerned (e.g., bi-prediction restriction or other techniques), the HEVC version 1 and the range extension specification are technically similar. Therefore, whenever changes are referred to herein based on HEVC version 1, the same changes may apply to the range extension specification, and whenever the HEVC version 1 module is reused herein, the HEVC range extension module are also reused (with the same sub-clauses).

Many embodiments described herein describe examples using the HEVC standard, or extensions thereof. However, the techniques and systems described herein may also be applicable to other coding standards, such as AVC, MPEG, extensions thereof, or other suitable coding standards already available or not yet available or developed. Accordingly, while the techniques and systems described herein may be described with reference to a particular video coding standard, one of ordinary skill in the art will appreciate that the description should not be interpreted to apply only to that particular standard.

Referring to FIG. 1, a video source 102 may provide the video data to the encoding device 104. The video source 102 may be part of the source device, or may be part of a device other than the source device. The video source 102 may include a video capture device (e.g., a video camera, a camera phone, a video phone, or the like), a video archive containing stored video, a video server or content provider providing video data, a video feed interface receiving video from a video server or content provider, a computer graphics system for generating computer graphics video data, a combination of such sources, or any other suitable video source.

The video data from the video source 102 may include one or more input pictures or frames. A picture or frame is a still image that is part of a video. The encoder engine 106 (or encoder) of the encoding device 104 encodes the video data to generate an encoded video bitstream. In some examples, an encoded video bitstream (or "video bitstream" or "bitstream") is a series of one or more coded video sequences. A coded video sequence (CVS) includes a series of access units (AUs) starting with an AU that has a random access point picture in the base layer and with certain properties up to and not including a next AU that has a random access point picture in the base layer and with certain properties. For example, the certain properties of a random access point picture that starts a CVS may include a RASL flag (e.g., NoRaslOutputFlag) equal to 1. Otherwise, a random access point picture (with RASL flag equal to 0) does not start a CVS. An access unit (AU) includes one or more coded pictures and control information corresponding to the coded pictures that share the same output time. Coded slices of pictures are encapsulated in the bitstream level into data units called network abstraction layer (NAL) units. For example, an HEVC video bitstream may include one or more CVSs including NAL units. Each of the NAL units has a NAL unit header. In one example, the header is one-byte for H.264/AVC (except for multi-layer extensions) and two-byte for HEVC. The syntax elements in the NAL unit header take the designated bits and therefore are visible to all kinds of systems and transport layers, such as Transport Stream, Real-time Transport (RTP) Protocol, File Format, among others.

Two classes of NAL units exist in the HEVC standard, including video coding layer (VCL) NAL units and non-VCL NAL units. A VCL NAL unit includes one slice or slice segment (described below) of coded picture data, and a non-VCL NAL unit includes control information that relates to one or more coded pictures. In some cases, a NAL unit can be referred to as a packet. An HEVC AU includes VCL NAL units containing coded picture data and non-VCL NAL units (if any) corresponding to the coded picture data.

NAL units may contain a sequence of bits forming a coded representation of the video data (e.g., an encoded video bitstream, a CVS of a bitstream, or the like), such as coded representations of pictures in a video. The encoder engine 106 generates coded representations of pictures by partitioning each picture into multiple slices. A slice is independent of other slices so that information in the slice is coded without dependency on data from other slices within the same picture. A slice includes one or more slice segments including an independent slice segment and, if present, one or more dependent slice segments that depend on previous slice segments. The slices are then partitioned into coding tree blocks (CTBs) of luma samples and chroma samples. A CTB of luma samples and one or more CTBs of chroma samples, along with syntax for the samples, are referred to as a coding tree unit (CTU). A CTU is the basic processing unit for HEVC encoding. A CTU can be split into multiple coding units (CUs) of varying sizes. A CU contains luma and chroma sample arrays that are referred to as coding blocks (CBs).

The luma and chroma CBs can be further split into prediction blocks (PBs). A PB is a block of samples of the luma component or a chroma component that uses the same motion parameters for inter-prediction or intra-block copy prediction (when available or enabled for use). The luma PB and one or more chroma PBs, together with associated syntax, form a prediction unit (PU). For inter-prediction, a set of motion parameters (e.g., one or more motion vectors, reference indices, or the like) is signaled in the bitstream for each PU and is used for inter-prediction of the luma PB and the one or more chroma PBs. For intra-block copy prediction, a set of motion parameters (e.g., one or more block vectors, or the like) can also be signaled for each PU and can be used for intra-block copy prediction. A CB can also be partitioned into one or more transform blocks (TBs). A TB represents a square block of samples of a color component on which the same two-dimensional transform is applied for coding a prediction residual signal. A transform unit (TU) represents the TBs of luma and chroma samples, and corresponding syntax elements.

A size of a CU corresponds to a size of the coding mode and may be square in shape. For example, a size of a CU may be 8×8 samples, 16×16 samples, 32×32 samples, 64×64 samples, or any other appropriate size up to the size of the corresponding CTU. The phrase "N×N" is used herein to refer to pixel dimensions of a video block in terms of vertical and horizontal dimensions (e.g., 8 pixels×8 pixels). The pixels in a block may be arranged in rows and columns. In some embodiments, blocks may not have the same number of pixels in a horizontal direction as in a vertical direction. Syntax data associated with a CU may describe, for example, partitioning of the CU into one or more PUs. Partitioning modes may differ between whether the CU is intra-prediction mode encoded or inter-prediction mode encoded. PUs may be partitioned to be non-square in shape. Syntax data associated with a CU may also describe, for example, partitioning of the CU into one or more TUs according to a CTU. A TU can be square or non-square in shape.

According to the HEVC standard, transformations may be performed using transform units (TUs). TUs may vary for different CUs. The TUs may be sized based on the size of PUs within a given CU. The TUs may be the same size or smaller than the PUs. In some examples, residual samples corresponding to a CU may be subdivided into smaller units using a quadtree structure known as residual quad tree (RQT). Leaf nodes of the RQT may correspond to TUs. Pixel difference values associated with the TUs may be transformed to produce transform coefficients. The transform coefficients may then be quantized by the encoder engine 106.

Once the pictures of the video data are partitioned into CUs, the encoder engine 106 predicts each PU using a prediction mode. The prediction unit or prediction block is then subtracted from the original video data to get residuals (described below). For each CU, a prediction mode may be signaled inside the bitstream using syntax data. A prediction mode may include intra-prediction (or intra-picture prediction) or inter-prediction (or inter-picture prediction). Using intra-prediction, each PU is predicted from neighboring image data in the same picture using, for example, DC prediction to find an average value for the PU, planar prediction to fit a planar surface to the PU, direction prediction to extrapolate from neighboring data, or any other suitable types of prediction. Using inter-prediction, each PU is predicted using motion compensation prediction from image data in one or more reference pictures (before or after the current picture in output order). The decision whether to code a picture area using inter-picture or intra-picture prediction may be made, for example, at the CU level.

In some examples, the one or more slices of a picture are assigned a slice type. Slice types include an I slice, a P slice, and a B slice. An I slice (intra-frames, independently decodable) is a slice of a picture that is only coded by Intra prediction, and therefore is independently decodable since the I slice requires only the data within the frame to predict any prediction unit or prediction block of the slice. A P slice (uni-directional predicted frames) is a slice of a picture that may be coded with intra-prediction and with uni-directional inter-prediction. Each prediction unit or prediction block within a P slice is either coded with Intra prediction or inter-prediction. When the inter-prediction applies, the prediction unit or prediction block is only predicted by one reference picture, and therefore reference samples are only from one reference region of one frame. A B slice (bi-directional predictive frames) is a slice of a picture that may be coded with intra-prediction and with inter-prediction (e.g., either bi-prediction or uni-prediction). A prediction unit or prediction block of a B slice may be bi-directionally predicted from two reference pictures, where each picture contributes one reference region and sample sets of the two reference regions are weighted (e.g., with equal weights or with different weights) to produce the prediction signal of the bi-directional predicted block. As explained above, slices of one picture are independently coded. In some cases, a picture can be coded as just one slice.

Intra-picture prediction utilizes the correlation between spatially neighboring samples within a picture. Inter-picture prediction uses the temporal correlation between pictures in order to derive a motion-compensated prediction for a block of image samples. Using a translational motion model, the position of a block in a previously decoded picture (a reference picture) is indicated by a motion vector ($\Delta x, \Delta y$), with $\Delta x$ specifying the horizontal displacement and $\Delta y$ specifying the vertical displacement of the reference block relative to the position of the current block. In some cases, a motion vector ($\Delta x, \Delta y$) can be in integer sample accuracy (also referred to as integer accuracy), in which case the motion vector points to the integer-pel grid (or integer-pixel sampling grid) of the reference frame. In some cases, a motion vector ($\Delta x, \Delta y$) can be of fractional sample accuracy (also referred to as fractional-pel accuracy or non-integer accuracy) to more accurately capture the movement of the underlying object, without being restricted to the integer-pel grid of the reference frame. Accuracy of motion vectors may be expressed by the quantization level of the motion vectors. For example, the quantization level may be integer accuracy (e.g., 1-pixel) or fractional-pel accuracy (e.g., ¼-pixel, ½-pixel, or other sub-pixel value). Interpolation is applied on reference pictures to derive the prediction signal when the corresponding motion vector has fractional sample accuracy. For example, samples available at integer positions can be filtered (e.g., using one or more interpolation filters) to estimate values at fractional positions. The previously decoded reference picture is indicated by a reference index (refIdx) to a reference picture list. The motion vectors and reference indices can be referred to as motion parameters. Two kinds of inter-picture prediction can be performed, including uni-prediction and bi-prediction.

With inter-prediction using bi-prediction, two sets of motion parameters ($\Delta x_0, y_0,$ refIdx$_0$ and $\Delta x_1, y_1,$ refIdx$_1$) are used to generate two motion compensated predictions (from the same reference picture or possibly from different reference pictures). For example, with bi-prediction, each prediction block uses two motion compensated prediction signals, and generates B prediction units. The two motion compensated predictions are then combined to get the final motion compensated prediction. For example, the two motion compensated predictions can be combined by averaging. In another example, weighted prediction can be used, in which case different weights can be applied to each motion compensated prediction. The reference pictures that can be used in bi-prediction are stored in two separate lists, denoted as list 0 and list 1. Motion parameters can be derived at the encoder using a motion estimation process.

With inter-prediction using uni-prediction, one set of motion parameters ($\Delta x_0, y_0,$ refIdx$_0$) is used to generate a motion compensated prediction from a reference picture. For example, with uni-prediction, each prediction block uses at most one motion compensated prediction signal, and generates P prediction units.

A PU may include the data (e.g., motion parameters or other suitable data) related to the prediction process. For example, when the PU is encoded using intra-prediction, the PU may include data describing an intra-prediction mode for the PU. As another example, when the PU is encoded using inter-prediction, the PU may include data defining a motion vector for the PU. The data defining the motion vector for a PU may describe, for example, a horizontal component of the motion vector ($\Delta x$), a vertical component of the motion vector ($\Delta y$), a resolution for the motion vector (e.g., integer precision, one-quarter pixel precision or one-eighth pixel precision), a reference picture to which the motion vector points, a reference index, a reference picture list (e.g., List 0, List 1, or List C) for the motion vector, or any combination thereof.

The encoding device 104 may then perform transformation and quantization. For example, following prediction, the encoder engine 106 may calculate residual values corresponding to the PU. Residual values may comprise pixel difference values between the current block of pixels being coded (the PU) and the prediction block used to predict the current block (e.g., the predicted version of the current block). For example, after generating a prediction block (e.g., issuing inter-prediction or intra-prediction), the encoder engine 106 can generate a residual block by subtracting the prediction block produced by a prediction unit from the current block. The residual block includes a set of pixel difference values that quantify differences between pixel values of the current block and pixel values of the prediction block. In some examples, the residual block may be represented in a two-dimensional block format (e.g., a two-dimensional matrix or array of pixel values). In such examples, the residual block is a two-dimensional representation of the pixel values.

Any residual data that may be remaining after prediction is performed is transformed using a block transform, which may be based on discrete cosine transform, discrete sine transform, an integer transform, a wavelet transform, other suitable transform function, or any combination thereof. In some cases, one or more block transforms (e.g., sizes 32×32, 16×16, 8×8, 4×4, or other suitable size) may be applied to residual data in each CU. In some embodiments, a TU may be used for the transform and quantization processes implemented by the encoder engine 106. A given CU having one or more PUs may also include one or more TUs. As described in further detail below, the residual values may be transformed into transform coefficients using the block transforms, and then may be quantized and scanned using TUs to produce serialized transform coefficients for entropy coding.

In some embodiments following intra-predictive or inter-predictive coding using PUs of a CU, the encoder engine 106 may calculate residual data for the TUs of the CU. The PUs may comprise pixel data in the spatial domain (or pixel domain). The TUs may comprise coefficients in the transform domain following application of a block transform. As previously noted, the residual data may correspond to pixel difference values between pixels of the unencoded picture and prediction values corresponding to the PUs. Encoder engine 106 may form the TUs including the residual data for the CU, and may then transform the TUs to produce transform coefficients for the CU.

The encoder engine 106 may perform quantization of the transform coefficients. Quantization provides further compression by quantizing the transform coefficients to reduce the amount of data used to represent the coefficients. For example, quantization may reduce the bit depth associated with some or all of the coefficients. In one example, a coefficient with an n-bit value may be rounded down to an m-bit value during quantization, with n being greater than m.

Once quantization is performed, the coded video bitstream includes quantized transform coefficients, prediction information (e.g., prediction modes, motion vectors, block vectors, or the like), partitioning information, and any other suitable data, such as other syntax data. The different elements of the coded video bitstream may then be entropy encoded by the encoder engine 106. In some examples, the encoder engine 106 may utilize a predefined scan order to scan the quantized transform coefficients to produce a serialized vector that can be entropy encoded. In some examples, encoder engine 106 may perform an adaptive scan. After scanning the quantized transform coefficients to form a vector (e.g., a one-dimensional vector), the encoder engine 106 may entropy encode the vector. For example, the encoder engine 106 may use context adaptive variable length coding, context adaptive binary arithmetic coding, syntax-based context-adaptive binary arithmetic coding, probability interval partitioning entropy coding, or another suitable entropy encoding technique.

The output 110 of the encoding device 104 may send the NAL units making up the encoded video bitstream data over the communications link 120 to the decoding device 112 of the receiving device. The input 114 of the decoding device 112 may receive the NAL units. The communications link 120 may include a channel provided by a wireless network, a wired network, or a combination of a wired and wireless network. A wireless network may include any wireless interface or combination of wireless interfaces and may include any suitable wireless network (e.g., the Internet or other wide area network, a packet-based network, WiFi™, radio frequency (RF), UWB, WiFi-Direct, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various equipment, such as base stations, routers, access points, bridges, gateways, switches, or the like. The encoded video bitstream data may be modulated according to a communication standard, such as a wireless communication protocol, and transmitted to the receiving device.

In some examples, the encoding device 104 may store encoded video bitstream data in storage 108. The output 110 may retrieve the encoded video bitstream data from the encoder engine 106 or from the storage 108. Storage 108 may include any of a variety of distributed or locally accessed data storage media. For example, the storage 108 may include a hard drive, a storage disc, flash memory, volatile or non-volatile memory, or any other suitable digital storage media for storing encoded video data.

The input 114 of the decoding device 112 receives the encoded video bitstream data and may provide the video bitstream data to the decoder engine 116, or to storage 118 for later use by the decoder engine 116. The decoder engine 116 may decode the encoded video bitstream data by entropy decoding (e.g., using an entropy decoder) and extracting the elements of one or more coded video sequences making up the encoded video data. The decoder engine 116 may then rescale and perform an inverse transform on the encoded video bitstream data. Residual data is then passed to a prediction stage of the decoder engine 116. The decoder engine 116 then predicts a block of pixels (e.g., a PU). In some examples, the prediction is added to the output of the inverse transform (the residual data).

The decoding device 112 may output the decoded video to a video destination device 122, which may include a display or other output device for displaying the decoded video data to a consumer of the content. In some aspects, the video destination device 122 may be part of the receiving device that includes the decoding device 112. In some aspects, the video destination device 122 may be part of a separate device other than the receiving device.

Supplemental Enhancement information (SEI) messages can be included in video bitstreams. For example, SEI messages may be used to carry information (e.g., metadata) that is not essential in order to decode the bitstream by the decoding device 112. This information is useful in improving the display or processing of the decoded output (e.g. such information could be used by decoder-side entities to improve the viewability of the content).

Extensions to the HEVC standard include the Multiview Video Coding extension, referred to as MV-HEVC, and the Scalable Video Coding extension, referred to as SHVC. The MV-HEVC and SHVC extensions share the concept of layered coding, with different layers being included in the encoded video bitstream. Each layer in a coded video sequence is addressed by a unique layer identifier (ID). A layer ID may be present in a header of a NAL unit to identify a layer with which the NAL unit is associated. In MV-HEVC, different layers can represent different views of the same scene in the video bitstream. In SHVC, different scalable layers are provided that represent the video bitstream in different spatial resolutions (or picture resolution) or in different reconstruction fidelities. The scalable layers may include a base layer (with layer ID=0) and one or more enhancement layers (with layer IDs=1, 2, . . . n). The base layer may conform to a profile of the first version of HEVC, and represents the lowest available layer in a bitstream. The enhancement layers have increased spatial resolution, temporal resolution or frame rate, and/or reconstruction fidelity (or quality) as compared to the base layer. The enhancement layers are hierarchically organized and may (or may not) depend on lower layers. In some examples, the different layers may be coded using a single standard codec (e.g., all layers are encoded using HEVC, SHVC, or other coding standard). In some examples, different layers may be coded using a multi-standard codec. For example, a base layer may be coded using AVC, while one or more enhancement layers may be coded using SHVC and/or MV-HEVC extensions to the HEVC standard.

In general, a layer includes a set of VCL NAL units and a corresponding set of non-VCL NAL units. The NAL units are assigned a particular layer ID value. Layers can be hierarchical in the sense that a layer may depend on a lower layer. A layer set refers to a set of layers represented within a bitstream that are self-contained, meaning that the layers within a layer set can depend on other layers in the layer set in the decoding process, but do not depend on any other layers for decoding. Accordingly, the layers in a layer set can form an independent bitstream that can represent video content. The set of layers in a layer set may be obtained from another bitstream by operation of a sub-bitstream extraction process. A layer set may correspond to the set of layers that is to be decoded when a decoder wants to operate according to certain parameters.

As previously described, an HEVC bitstream includes a group of NAL units, including VCL NAL units and non-VCL NAL units. VCL NAL units include coded picture data forming a coded video bitstream. For example, a sequence of bits forming the coded video bitstream is present in VCL NAL units. Non-VCL NAL units may contain parameter sets with high-level information relating to the encoded video bitstream, in addition to other information. For example, a parameter set may include a video parameter set (VPS), a sequence parameter set (SPS), and a picture parameter set (PPS). Examples of goals of the parameter sets include bit rate efficiency, error resiliency, and providing systems layer interfaces. Each slice references a single active PPS, SPS, and VPS to access information that the decoding device 112 may use for decoding the slice. An identifier (ID) may be coded for each parameter set, including a VPS ID, an SPS ID, and a PPS ID. An SPS includes an SPS ID and a VPS ID. A PPS includes a PPS ID and an SPS ID. Each slice header includes a PPS ID. Using the IDs, active parameter sets can be identified for a given slice.

A PPS includes information that applies to all slices in a given picture. Because of this, all slices in a picture refer to the same PPS. Slices in different pictures may also refer to the same PPS. An SPS includes information that applies to all pictures in a same coded video sequence (CVS) or bitstream. As previously described, a coded video sequence is a series of access units (AUs) that starts with a random access point picture (e.g., an instantaneous decode reference (IDR) picture or broken link access (BLA) picture, or other appropriate random access point picture) in the base layer and with certain properties (described above) up to and not including a next AU that has a random access point picture in the base layer and with certain properties (or the end of the bitstream). The information in an SPS may not change from picture to picture within a coded video sequence. Pictures in a coded video sequence may use the same SPS. The VPS includes information that applies to all layers within a coded video sequence or bitstream. The VPS includes a syntax structure with syntax elements that apply to entire coded video sequences. In some embodiments, the VPS, SPS, or PPS may be transmitted in-band with the encoded bitstream. In some embodiments, the VPS, SPS, or PPS may be transmitted out-of-band in a separate transmission than the NAL units containing coded video data.

In some embodiments, the video encoding device 104 and/or the video decoding device 112 may be integrated with an audio encoding device and audio decoding device, respectively. The video encoding device 104 and/or the video decoding device 112 may also include other hardware or software that is necessary to implement the coding techniques described above, such as one or more microprocessors, digital signal processors (DSPs), application specific integrated circuits (ASICs), field programmable gate arrays (FPGAs), discrete logic, software, hardware, firmware or any combinations thereof. The video encoding device 104 and the video decoding device 112 may be integrated as part of a combined encoder/decoder (codec) in a respective device. An example of specific details of the encoding device 104 is described below with reference to FIG. 7. An example of specific details of the decoding device 112 is described below with reference to FIG. 8.

Investigation for new coding tools for screen-content material such as text and graphics with motion has been performed, and technologies that improve the coding efficiency for screen content have been proposed. Significant improvements in coding efficiency can be obtained by exploiting the characteristics of screen content with dedicated coding tools. Efforts are underway with the target of possibly developing future extensions of the High Efficiency Video Coding (HEVC) standard, including specific tools for screen content coding (SCC).

As previously described, various prediction modes may be used in a video coding process, including intra-prediction and inter-prediction. One form of intra-prediction includes intra-block copy (IBC). The intra-block copy mode of intra-prediction was included in the HEVC range extension working draft text (JCTVC-P1005). Using redundancy in an image picture or frame, intra-block copy performs block matching to predict a block of samples (e.g., a CU, a PU, or other coding block) as a displacement from a reconstructed block of samples in a neighboring or a non-neighboring region of the picture. By removing the redundancy from repeating patterns of content, the intra-block copy prediction improves coding efficiency.

Figure 2:
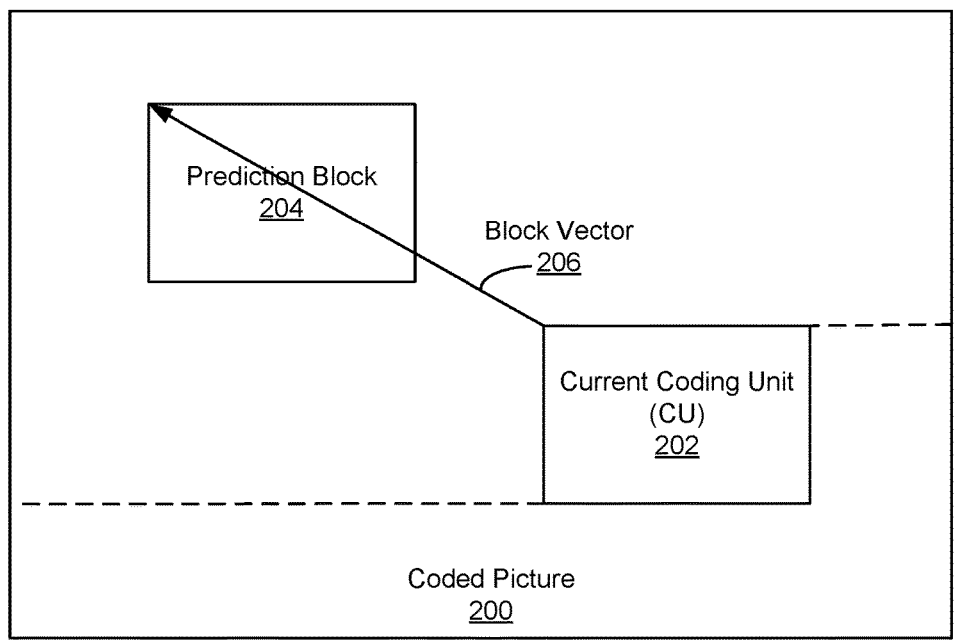
FIG. 2 is a block diagram illustrating an example of a coded picture for which an intra-block copy prediction mode is applied.

The intra-block copy (IBC) mode enables spatial prediction from non-neighboring samples but within the current picture. For example, FIG. 2 illustrates a coded picture 200 in which intra-block copy is used to predict a current coding unit 202. The coding unit 202 can include a CTU or a partition of a CTU (e.g., a coding unit (CU) containing luma and chroma sample arrays referred to as coding blocks, a coding block, a prediction unit (PU) containing a luma prediction block (PB) and one or more chroma PBs, a prediction block, or other partition including a block of pixels). The current coding unit 202 is predicted from an already decoded prediction block 204 (before in-loop filtering) of the coded picture 200 using the block vector 206. In-loop filtering may be performed using either or both of an in-loop de-blocking filter and a Sample Adaptive Offset (SAO) filter. In the decoder, the predicted values can be added to the residues without any interpolation. For example, the block vector 206 may be signaled as an integer value. After block vector prediction, the block vector difference is encoded using a motion vector difference coding method, such as that specified in the HEVC standard. Intra-block copy is enabled at both CU and PU level. In some instances, for PU level intra-block copy, 2N×N and N×2N PU partition is supported for all the CU sizes. In some cases, when the CU is the smallest CU, N×N PU partition is supported. In some examples, intra-block copy can be performed for a coding unit using only prediction blocks from a same slice.

Various problems arise in relation to intra-block copy, such as due to an IBC large search area. For example, problems with memory bandwidth and increased processing can be introduced when intra-block copy is used. Contrary to traditional intra-prediction modes, intra-block copy allows spatial prediction from non-neighboring samples (which may be referred to as a prediction block, a block or a block of samples). These non-neighboring samples could be from any of the already decoded samples (before in-loop filtering) within the same picture and signaled by a block vector. Memory accesses of these non-neighboring samples increase the overall memory bandwidth when intra-block copy is used. For example, increased read access is caused, at least in part, by fetching of spatial prediction samples (that are not in cache/local memory). The read access is increased as compared to traditional intra-prediction results because, in traditional intra-prediction mode, the neighboring samples that are used are only 1 row of above samples and 1 column of left samples, and thus can be placed into cache memory. However, when intra-block copy is used, previously encoded and/or decoded samples from neighboring and non-neighboring samples may be used as a reference unit (e.g., a prediction block), which increases the amount of data that needs to be stored. In some cases, the additional data cannot be stored in cache or other local memory, and must be stored using additional storage mechanisms. Accordingly, in order to support the increased number of available samples, the system needs to support additional memory usage.

Furthermore, increased write access is caused due, in part, to the storage of both unfiltered samples (e.g., a prediction block) for intra-block copy spatial prediction and filtered reconstructed samples for output/temporal prediction for future pictures. For example, unfiltered samples are used as reference for intra-block copy, and thus the system needs to store the unfiltered samples as well as the filtered samples that are generated during in-loop filtering. The filtered samples can be used for prediction of subsequent frames (e.g., using inter-prediction).

As previously described, inter-prediction mode may include uni-prediction or bi-prediction. With bi-prediction, a prediction block uses two motion compensated prediction signals and two motion vectors (MVs), which burdens memory and processing. Further, as discussed above, the intra-block copy mode increases the worst case memory accesses (overall worst case bandwidth) due to the additional need to store non-neighboring samples and unfiltered samples of the current picture, in addition to filtered samples.

One or more systems and methods of coding are described herein that provide restrictions on certain prediction modes for video coding, which can be used to efficiently resolve the problems described above. For example, one or more systems and methods of coding are directed to improving memory bandwidth efficiency, limiting worst case memory accesses, and other aspects of intra-block copy (e.g., for high-efficiency video coding (HEVC) extensions, such as screen content coding, or other HEVC extension). The proposed systems and methods in this document are also applicable to HEVC and HEVC extensions, in general, including the support of possibly high bit depth (e.g., more than 8 bit, or other bit depth), high chroma sampling format (e.g., including 4:4:4 and 4:2:2, or other sampling), or other aspects of HEVC and HEVC extensions.

One or more embodiments are described herein for imposing a restriction that prevents inter-prediction bi-prediction from being performed on video data when certain conditions are met. For instance, various examples of restricting bi-prediction based on intra-block copy prediction and other conditions are provided below. Each of the embodiments and/or examples described herein can work jointly or separately with other embodiments. The proposed methods are described with respect to intra-block copy, but can also be applied to other coding tools with high bandwidth and cache requirement, such as 1-D dictionary, palette coding, or other suitable coding technique.

In some examples, a restriction may be imposed on bi-prediction when intra-block copy prediction is enabled. For example, the bi-prediction restriction can be applied when intra-block copy prediction is enabled for one or more coding units or prediction blocks of the video data. In such an example, bi-prediction can be disabled for certain coding units (e.g., a current block being coded) when intra-block copy prediction is enabled. Various forms of bi-prediction can be restricted, such as 8×8 bi-prediction or other bi-prediction. By restricting bi-prediction, the HEVC v1 worst case bandwidth limit may be maintained, such as for the screen content coding (SCC) extensions.

In some examples, in addition to intra-block copy prediction being enabled, other conditions can also be required for the bi-prediction restriction to apply. For example, other conditions can include a syntax element having a value indicating (e.g., for a slice, for a coding unit, or the like) that one or more motion vectors are in non-integer accuracy (e.g., a fractional motion vector), both motion vectors of bi-prediction block being in non-integer accuracy, the motion vectors of a bi-prediction block not being identical and/or not pointing to the same reference picture, or any combination thereof. If one or more of these conditions are met (in addition to intra-block copy prediction being enabled), the restriction on bi-prediction can be applied, preventing bi-prediction from being performed on certain coding units or blocks. When the bi-prediction restriction is imposed, other predictions modes are available for encoding or decoding the video data, including uni-prediction and intra-prediction (e.g., IBC or other intra-prediction). In some cases, uni-prediction can also be restricted when one or more of the conditions are met. The bi-prediction block (that is checked for its motion vectors being in non-integer accuracy and/or not being identical and/or not pointing to the same reference picture) can be from the picture containing a current block being coded, from the slice containing the current block, or from a coding unit (e.g., a CTU, a CU, or other unit of video data being decoded) containing the current block. For example, if any bi-prediction block in a current picture containing the current block being coded has both motion vectors that are in non-integer accuracy and/or that are not identical or not pointing to the same reference picture, the restriction can be imposed (when the other restrictions are met, such as IBC being enabled). In another example, if any bi-prediction block in a current slice containing the current block being coded has both motion vectors that are in non-integer accuracy and/or that are not identical or not pointing to the same reference picture, the restriction can be imposed (when the other restrictions are met, such as IBC being enabled). In another example, if any bi-prediction block in a current coding unit containing the current block being coded has both motion vectors that are in non-integer accuracy and/or that are not identical or not pointing to the same reference picture, the restriction can be imposed (when the other restrictions are met, such as IBC being enabled).

In some examples, a restriction may be imposed on bi-prediction when intra-block copy is enabled and a use_integer_mv flag is set to a value indicating one or more motion vectors are in non-integer accuracy. The use_integer_mv flag can be signaled at the slice level or the block level. For example, the one or more motion vectors may be associated with any block within a slice, a specific coding unit or block, or other unit of a picture. In one illustrative example, if any motion vector associated with any block within a slice is in non-integer accuracy (in addition to intra-block copy prediction being enabled), the restriction can be applied. The use_integer_mv flag may be referred to herein as a motion vector resolution flag. The motion vector resolution flag specifies the resolution of motion vectors (MVs) used for inter-prediction mode. For example, the motion vector resolution flag can be set to a value indicating (e.g., for a slice, for a coding unit, or the like) that one or more motion vectors are in non-integer accuracy (e.g., a fractional motion vector). In one illustrative example, a value of 0 for the motion vector resolution flag indicates that one or more motion vectors (e.g., in a slice, in a coding unit, or other portion of a picture) have fractional-pel accuracy, and a value of 1 for the motion vector resolution flag indicates that all motion vectors (e.g., in a slice, in a coding unit, or other portion of a picture) are in integer accuracy. One of ordinary skill in the art will appreciate that a value of 1 can indicate one or more motion vectors as having fractional-pel accuracy, and a value of 0 can indicate that all motion vectors have integer accuracy.

One or more other conditions can be required to be met before restriction on bi-prediction can be applied. For the screen content coding (SCC) extension to HEVC, when at least one of the motion vectors (MVs) of a bi-prediction block (e.g., an 8×8 bi-prediction block, or other suitable sized bi-prediction block, such as 4×8, 8×4, 16×16, or any other suitable size bi-prediction block) have integer accuracy, the HEVC version 1 bandwidth worst case limit is maintained (not exceeded). For example, the bandwidth worst case limit is maintained in this scenario due to the fact that when the MV is integer accuracy, samples needed for interpolations need not be loaded, as interpolation is needed only when motion vectors with fractional accuracy are used. In a scenario when an MV of a bi-prediction block has integer accuracy, a bi-prediction restriction (e.g., 8×8 bi-prediction restriction or other suitable bi-prediction restriction) may not be imposed. A condition for restricting bi-prediction can thus include both the MVs of a bi-prediction block being in non-integer accuracy (e.g., fractional-pel accuracy). As noted previously, the accuracy of motion vectors may be expressed by the quantization level of the motion vectors. The quantization level may, for example, be integer accuracy (e.g., 1-pixel) or fractional-pel accuracy (e.g., ¼-pixel, ½-pixel, or other sub-pixel value).

Further, for the SCC extension to HEVC, when both the MVs of a bi-prediction block are identical and/or point to the same reference picture (refPic), the HEVC version 1 bandwidth worst case limit is maintained. For example, the bandwidth worst case limit is maintained in this scenario due to the fact that when both MVs are identical and pointing to the same refPic, the prediction samples need not be loaded twice for each MV. That is, the same prediction samples can be loaded only once, since the MVs point to the same samples. In a scenario when both the MVs of a bi-prediction block are identical and point to the same refPic, a bi-prediction restriction (e.g., 8×8 bi-prediction restriction) need not be imposed. Another condition for restricting bi-prediction can thus include the MVs of a bi-prediction block being identical and/or being from the same reference index.

According to the above-described examples, one or more embodiments include selectively imposing a restriction on bi-prediction (e.g., 8×8 bi-prediction, or other bi-prediction). In some instances, it may be better for a coder to perform bi-prediction because bi-prediction provides the benefit of more compression efficiency, and when bi-prediction is restricted, the efficiency is lost. Therefore, a refined restriction on bi-prediction is provided herein, where the restriction is applied only in cases in which it is needed. For example, bi-prediction (e.g., 8×8 bi-prediction, or other bi-prediction) may be restricted when one or more or all conditions are met, including any combination thereof. The restriction may include disabling bi-prediction when the conditions are met. The conditions may, for example, include:
  a) IBC is enabled for the current block based on slice, picture, or sequence level IBC control;
  b) Use_integer_mv is equal to zero for current slice;
  c) Both the MVs of a bi-prediction block (e.g., an 8×8 bi-prediction block or other size bi-prediction block) are in non-integer accuracy (e.g., the MVs are in fractional-pel accuracy);
  d) Following is not true: MVs of a bi-prediction block (e.g., an 8×8 bi-prediction block or other size bi-prediction block) are identical and pointing to the same reference picture.

The restriction on bi-prediction may be imposed when one or more of the above conditions are met, a combination of the conditions is met, or when all of the conditions are met. Similarly, the restriction on bi-prediction may not be imposed when one or more of the above conditions are not met, a combination of the conditions is not met, or when all of the conditions are not met.

In one example, when intra-block copy is enabled for a current block or other coding unit, a value of the use_integer_mv flag is zero (indicating one or more MVs in a slice that contains the current block are in non-integer accuracy), and both the MVs of a bi-prediction block (e.g., an 8×8 bi-prediction block or other size bi-prediction block) are in non-integer accuracy, the restriction is imposed and bi-prediction is disabled for certain prediction blocks in Inter frames (I-frames). For instance, bi-prediction can be disabled for only certain prediction blocks, such as prediction blocks with a size that is less than or equal to a predefined size (e.g., 8×8 bi-prediction blocks, or other suitable size).

In another example, when intra-block copy is enabled for a current block or other coding unit, a value of the use_integer_mv flag is zero, and the MVs of a bi-prediction block (e.g., an 8×8 bi-prediction block or other size bi-prediction block) are not identical and/or are not pointing to the same reference picture (condition d) above is met), bi-prediction is disabled for certain prediction blocks in I-frames (e.g., when the prediction block size is less than or equal to a predefined size, such as 8×8 or other suitable size).

In yet another example, when intra-block copy is enabled for a current block or other coding unit, a value of the use_integer_mv_flag is zero, both the MVs of a bi-prediction block (e.g., an 8×8 bi-prediction block or other size bi-prediction block) are in non-integer accuracy, and the MVs of a bi-prediction block (e.g., an 8×8 bi-prediction block or other size bi-prediction block) are not identical and/or are not pointing to the same reference picture (condition d) above is met), bi-prediction is disabled for certain prediction blocks in I-frames (e.g., when the prediction block size is less than or equal to a predefined size, such as 8×8 or other suitable size).

In another example, when intra-block copy is enabled for a current block or other coding unit and both the MVs of a bi-prediction block (e.g., an 8×8 bi-prediction block or other size bi-prediction block) are in non-integer accuracy, the restriction is imposed and bi-prediction is disabled for certain prediction blocks in Inter frames (I-frames). For instance, bi-prediction can be disabled for only certain prediction blocks, such as prediction blocks with a size that is less than or equal to a predefined size (e.g., 8×8 bi-prediction blocks, or other suitable size).

In another example, when intra-block copy is enabled for a current block or other coding unit and the MVs of a bi-prediction block (e.g., an 8×8 bi-prediction block or other size bi-prediction block) are not identical and/or are not pointing to the same reference picture (condition d) above is met), bi-prediction is disabled for certain prediction blocks in I-frames (e.g., when the prediction block size is less than or equal to a predefined size, such as 8×8 or other suitable size).

In yet another example, when intra-block copy is enabled for a current block or other coding unit, both the MVs of a bi-prediction block (e.g., an 8×8 bi-prediction block or other size bi-prediction block) are in non-integer accuracy, and the MVs of a bi-prediction block (e.g., an 8×8 bi-prediction block or other size bi-prediction block) are not identical and/or are not pointing to the same reference picture (condition d) above is met), bi-prediction is disabled for certain prediction blocks in I-frames (e.g., when the prediction block size is less than or equal to a predefined size, such as 8×8 or other suitable size).

In some embodiments, a decoder-side restriction on bi-prediction may be implemented based on one or more of the conditions a)-d) above, or a combination thereof. For example, the conditions a)-d) may be imposed as decoder restrictions by disallowing certain values of the syntax element inter_pred_idc (e.g., inter_pred_idc=2) so that bi-prediction (e.g., 8×8 bi-prediction or any other bi-prediction) cannot be signalled when one or more of the conditions a)-d) are met. The syntax element inter_pred_idc may specifiy whether list0, list1, or bi-prediction is used for the current prediction unit.

Any of the examples provided above can be used to impose the decoder-side restriction on bi-prediction. For example, the decoder-side restriction can be applied when intra-block copy is enabled and use_integer_mv is zero. As another example, the decoder-side restriction can be applied when intra-block copy is enabled and both the MVs of a bi-prediction block (e.g., an 8×8 bi-prediction block or other size bi-prediction block) are in non-integer accuracy. As yet another example, the decoder-side restriction can be applied when intra-block copy is enabled and the MVs of a bi-prediction block (e.g., an 8×8 bi-prediction block or other size bi-prediction block) are not identical and/or are not pointing to the same reference picture (condition d) above is met). As another example, the decoder-side restriction can be applied when intra-block copy is enabled, use_integer_mv is zero, and both the MVs of a bi-prediction block (e.g., an 8×8 bi-prediction block or other size bi-prediction block) are in non-integer accuracy. As another example, the decoder-side restriction can be applied when intra-block copy is enabled, use_integer_mv is zero, and the MVs of a bi-prediction block (e.g., an 8×8 bi-prediction block or other size bi-prediction block) are not identical and/or are not pointing to the same reference picture (condition d) above is met). As yet another example, the decoder-side restriction can be applied when intra-block copy is enabled, use_integer_mv is zero, both the MVs of a bi-prediction block (e.g., an 8×8 bi-prediction block or other size bi-prediction block) are in non-integer accuracy, and the MVs of a bi-prediction block (e.g., an 8×8 bi-prediction block or other size bi-prediction block) are not identical and/or are not pointing to the same reference picture (condition d) above is met). As another example, the decoder-side restriction can be applied when intra-block copy is enabled, both the MVs of a bi-prediction block (e.g., an 8×8 bi-prediction block or other size bi-prediction block) are in non-integer accuracy, and the MVs of a bi-prediction block (e.g., an 8×8 bi-prediction block or other size bi-prediction block) are not identical and/or are not pointing to the same reference picture (condition d) above is met).

In one example of a decoder-side restriction, 8×8 bi-prediction (or other bi-prediction) can be disallowed when intra-block copy is enabled and use_integer_mv is zero. One of ordinary skill in the art will appreciate that this example applies to other types of bi-prediction other than 8×8 bi-prediction. For instance, the variable EightbyEightBiPredRestrictionEnableflag can be derived as EightbyEightBiPredRestrictionEnableflag=curr_pic_as_ref_enabled_flag && !use_integer_mv_flag. In this derivation, the curr_pic_as_ref_enabled_flag may be based on an SPS flag, a PPS flag, or a VPS flag. In some examples, the curr_pic_as_ref_enabled_flag equal to 1 may specify that a current picture referring to an SPS or PPS (or other parameter set) may be included in a reference picture list of the picture itself (meaning that it can be used in an IBC-based prediction). In some examples, the curr_pic_as_ref_enabled_flag equal to 0 may specify that a picture referring to the SPS or PPS (or other parameter set) is never included in any reference picture list of the picture itself. In some examples, when not present, the value of curr_pic_as_ref_enabled_flag may be inferred to be equal to 0 (or 1 in some examples). The EightbyEightBiPredRestrictionEnableflag flag is also referred to as the bi-prediction restriction flag, and the curr_pic_as_ref_enabled_flag is also referred to as the IBC flag. Using the above formulation, when the IBC flag is equal to 1 and the motion vector resolution flag is equal to 0, the bi-prediction restriction flag is equal to 1. When the bi-prediction restriction flag is equal to 1, the bi-prediction restriction is enabled.

According to the current "High Efficiency Video Coding (HEVC) Screen Content Coding: Draft 3," the inter_pred_idc[x0][y0] syntax specifies whether list0, list1, or bi-prediction is used for the current prediction unit, according to Table 7-11, shown below. The array indices x0, y0 specify the location (x0,y0) of the top-left luma sample of the considered prediction block relative to the top-left luma sample of the picture. The two variables nPbW and nPbH specify the width and the height of the current luma prediction block.

TABLE 7-11

Name association to inter prediction mode

| | Name of inter_pred_idc | |
|---|---|---|
| inter_pred_idc | ( nPbW + nPbH ) != 12 | ( nPbW + nPbH ) == 12 |
| 0 | PRED_L0 | PRED_L0 |
| 1 | PRED_L1 | PRED_L1 |
| 2 | PRED_BI | Na |

In the above example implementation in which 8×8 bi-prediction (or other bi-prediction) is disallowed when intra-block copy is enabled and use_integer_mv is zero, the value of inter_pred_idc[x0][y0] that specifies whether list0, list1, or bi-prediction is used for the current prediction unit is derived according to a modified version of Table 7-11 (labeled below as Table 1—Name association to inter prediction mode).

TABLE 1

Name association to inter prediction mode

| | Name of inter_pred_idc | |
|---|---|---|
| inter_pred_idc | (EightbyEightBiPredRestrictionEnableflag)? ( nPbW > 8 ‖ nPbH > 8 ) : ( nPbW + nPbH ) != 12 | (EightbyEightBiPredRestrictionEnableflag)? (nPbW <=8 && nPbH <=8 ) : ( nPbW + nPbH ) == 12 |
| 0 | PRED_L0 | PRED_L0 |
| 1 | PRED_L1 | PRED_L1 |
| 2 | PRED_BI | Na |

In a second example of a decoder-side restriction, examples may include disallowing 8×8 bi-prediction (or other bi-prediction) when intra-block copy is enabled, the use_integer_mv is zero, both the MVs of an 8×8 bi-prediction block are in non-integer accuracy (e.g., fractional-pel accuracy), and the following is not true: MVs of an 8×8 bi-prediction block are identical and point to the same reference picture (meaning that either one or both of: the MVs of an 8×8 bi-prediction block are not identical or are not pointing to the same reference picture). In this example, the variable EightbyEightBiPredhasIntegermv is derived as EightbyEightBiPredhasnoIntegermv=!((mvL0 & 0×3==0)‖(mvL1&0×3==0)). The variable EightbyEightBiPredIdenticalMv is derived as EightbyEightBiPrednotIdenticalMv=!((mvL0==mvL1) && (refIdxL0==refIdxL1)). The variable EightbyEightBiPredRestrictionEnableflag is derived as EightbyEightBiPredRestrictionEnableflag=(curr_pic_as_ref_enabled_flag && !use_integer_mv && EightbyEightBiPredhasnoIntegermv && EightbyEightBiPrednotIdenticalMv). In this derivation, the curr_pic_as_ref_enabled_flag may be based on an SPS flag or a PPS flag.

In the above second example implementation of the decoder-side rescrition, the value of inter_pred_idc[x0][y0] that specifies whether list0, list1, or bi-prediction is used for the current prediction unit is derived according to another modified version of Table 7-11 (labeled below as Table 2—Name association to inter prediction mode), and with the different values of the corresponding variables.

TABLE 2

Name association to inter prediction mode

| | Name of inter_pred_idc | |
|---|---|---|
| inter_pred_idc | (EightbyEightBiPredRestrictionEnableflag)? ( nPbW > 8 ‖ nPbH > 8 ) : ( nPbW + nPbH ) != 12 | (EightbyEightBiPredRestrictionEnableflag)? (nPbW <=8 && nPbH <=8 ) : ( nPbW + nPbH ) == 12 |
| 0 | PRED_L0 | PRED_L0 |
| 1 | PRED_L1 | PRED_L1 |
| 2 | PRED_BI | Na |

Using the techniques and systems described herein, intra-block copy techniques are performed with reduced memory bandwidth and size requirements. For example, when intra-block copy prediction is used and certain other conditions are met, bi-prediction can be disabled so that the burden on memory bandwidth and size is minimized. As a result, memory bandwidth efficiency is improved, worst case memory accesses are limited, and other aspects of intra-block copy are enhanced.

Figure 3:
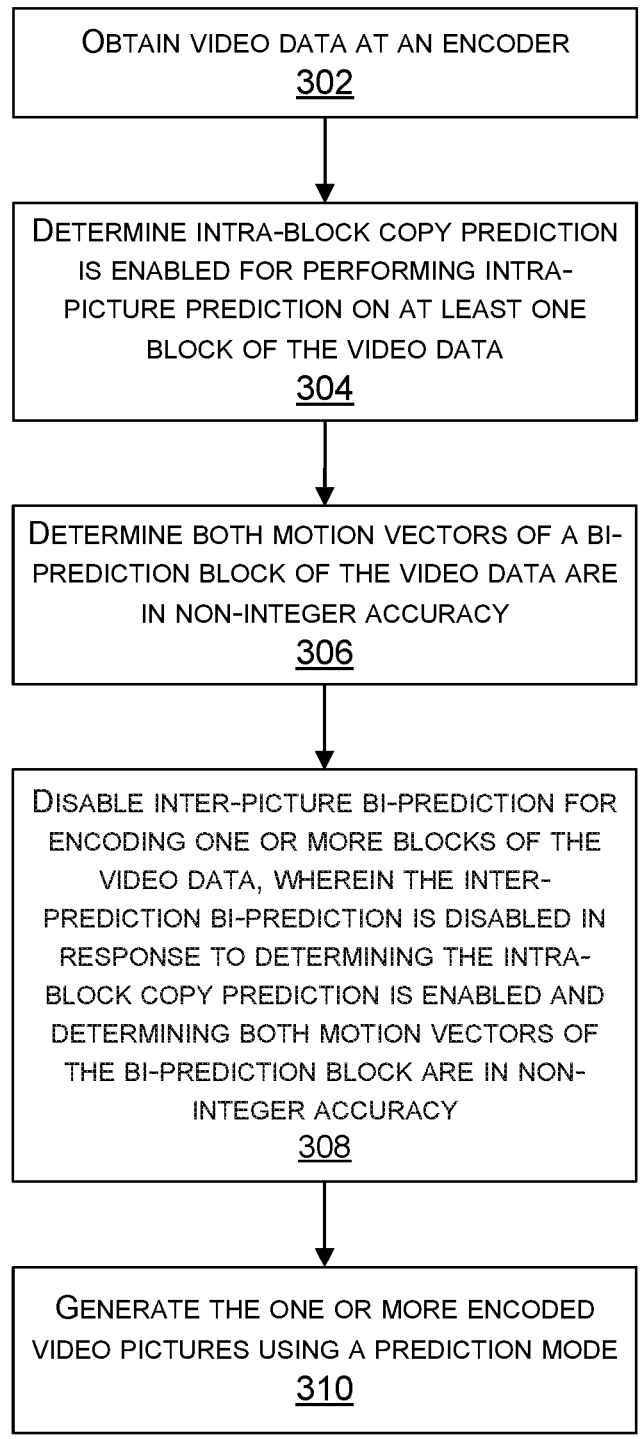
FIG. 3 illustrates an example of a process of encoding video data.

FIG. 3 illustrates an example of a process 300 of encoding video data to generate a one or more encoded video pictures using one or more of the techniques described herein. At 302, the process 300 includes obtaining video data at an encoder. The video data can include a current picture, a current slice of a current picture, a current coding unit (e.g., a CTU, a CU, or other unit of video data being coded), or any other video data.

At 304, the process 300 includes determining intra-block copy prediction is enabled for performing intra-picture prediction on at least one block of the video data. For example, IBC can be enabled for a block of the current picture, a block of the current slice, a block of a current coding unit (e.g., a CTU, a CU, or other unit of video data being coded). In some examples, IBC can be enabled on a picture, slice, or coded video sequence (CVS) level.

At 306, the process 300 includes determining both motion vectors of a bi-prediction block of the video data are in non-integer accuracy. For example, both vectors of the bi-prediction block can be determined to have fractional-pel accuracy, as described above. In some examples, the bi-prediction block includes an 8×8 bi-prediction block. In some examples, the bi-prediction block can include any block with a certain partition size, such as a 4×4 block, a 16×16 block, or any other suitable block.

At 308, the process 300 includes disabling inter-picture bi-prediction for encoding one or more blocks of the video data. The inter-prediction bi-prediction is disabled in response to determining the intra-block copy prediction is enabled and determining both motion vectors of the bi-prediction block are in non-integer accuracy. In some examples, inter-picture uni-prediction can still be used when inter-picture bi-prediction is disabled. In some examples, inter-picture uni-prediction can also be disabled when inter-picture bi-prediction is disabled.

At 310, the process 300 includes generating the one or more encoded video pictures using a prediction mode. The prediction mode can include intra-prediction or inter-prediction uni-prediction. In one illustrative example, the process 300 can include performing the intra-picture prediction on the video data using the intra-block copy prediction to generate the one or more encoded video pictures. In another illustrative example, the process 300 can include performing intra-picture prediction to generate the one or more encoded video pictures. In another illustrative example, the process 300 can include performing inter-picture uni-prediction to generate the one or more encoded video pictures.

In some aspects, the process 300 includes determining both motion vectors of the bi-prediction block are not identical or are not pointing to a same reference picture. In such aspects, disabling inter-prediction bi-prediction at 308 includes disabling the inter-picture bi-prediction for encoding the one or more blocks of the video data in response to determining the intra-picture prediction is enabled, determining both motion vectors of the bi-prediction block are in non-integer accuracy, and determining both motion vectors of the bi-prediction block are not identical or are not pointing to the same reference picture.

In some aspects, the process 300 includes determining a value of a motion vector resolution flag is equal to zero. The motion vector resolution flag specifies a resolution of motion vectors used for an inter-prediction mode. In some examples, the motion vector resolution flag includes the use_integer_mv flag described above. In such aspects, disabling inter-prediction bi-prediction at 308 includes disabling the inter-picture bi-prediction for encoding the one or more blocks of the video data in response to determining the intra-picture prediction is enabled, determining both motion vectors of the bi-prediction block are in non-integer accuracy, and determining the value of the motion vector resolution flag is equal to zero.

In some aspects, the video data comprises a slice of a picture. The slice includes a plurality of blocks, as described above. In such aspects, disabling inter-prediction bi-prediction at 308 includes disabling the inter-picture bi-prediction for encoding the plurality of blocks of the slice. For example, inter-picture bi-prediction can be restricted for only blocks of the slice, and not for blocks of other slices of the picture. In some examples, a picture can include only a single slice. In some examples, a picture can include multiple slices.

In some aspects, the inter-picture bi-prediction is disabled for encoding prediction blocks that are less than a threshold size. In some examples, the threshold size includes a prediction block size of 8×8 pixels or any other suitable block size.

Figure 4:
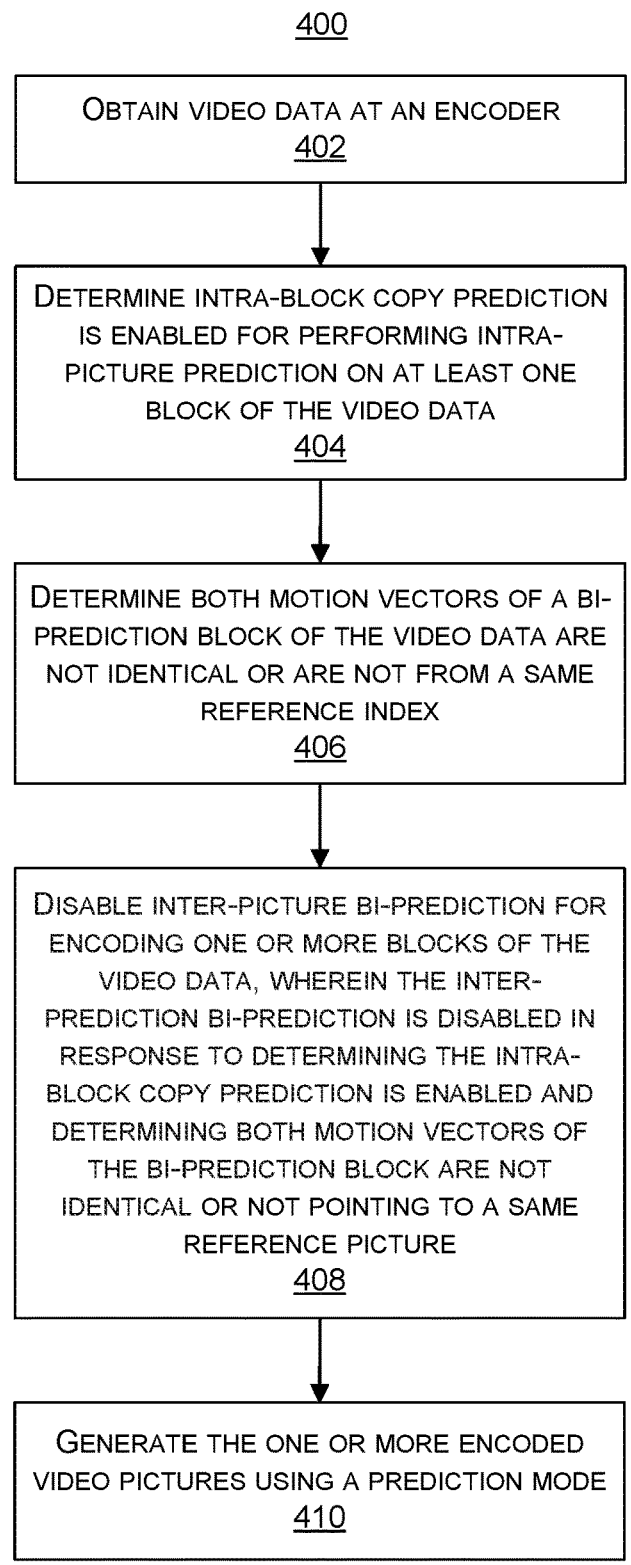
FIG. 4 illustrates another example of a process of decoding video data.

FIG. 4 illustrates another example of a process 400 of encoding video data to generate a one or more encoded video pictures using one or more of the techniques described herein. At 402, the process 400 includes obtaining video data at an encoder. The video data can include a current picture, a current slice of a current picture, a current coding unit (e.g., a CTU, a CU, or other unit of video data being coded), or any other video data.

At 404, the process 400 includes determining intra-block copy prediction is enabled for performing intra-picture prediction on at least one block of the video data. For example, IBC can be enabled for a block of the current picture, a block of the current slice, a block of a current coding unit (e.g., a CTU, a CU, or other unit of video data being coded). In some examples, IBC can be enabled on a picture, slice, or coded video sequence (CVS) level.

At 406, the process 400 includes determining both motion vectors of a bi-prediction block of the video data are not identical or are not pointing to a same reference picture. In some examples, the bi-prediction block includes an 8×8 bi-prediction block. In some examples, the bi-prediction block can include any block with a certain partition size, such as a 4×4 block, a 16×16 block, or any other suitable block.

At 408, the process 400 includes disabling inter-picture bi-prediction for encoding one or more blocks of the video data. The inter-prediction bi-prediction is disabled in response to determining the intra-block copy prediction is enabled and determining both motion vectors of the bi-prediction block are not identical or are not pointing to the same reference picture. In some examples, inter-picture uni-prediction can still be used when inter-picture bi-prediction is disabled. In some examples, inter-picture uni-prediction can also be disabled when inter-picture bi-prediction is disabled.

At 410, the process 400 includes generating the one or more encoded video pictures using a prediction mode. The prediction mode can include intra-prediction or inter-prediction uni-prediction. In one illustrative example, the process 400 can include performing the intra-picture prediction on the video data using the intra-block copy prediction to generate the one or more encoded video pictures. In another illustrative example, the process 400 can include performing intra-picture prediction to generate the one or more encoded video pictures. In another illustrative example, the process 400 can include performing inter-picture uni-prediction to generate the one or more encoded video pictures.

In some aspects, the process 400 includes determining both motion vectors of the bi-prediction block are in non-integer accuracy. In such aspects, disabling inter-prediction bi-prediction at 408 includes disabling the inter-picture bi-prediction for encoding the one or more blocks of the video data in response to determining the intra-picture prediction is enabled, determining both motion vectors of the bi-prediction block are not identical or are not pointing to the same reference picture, and determining both motion vectors of the bi-prediction block are in non-integer accuracy.

In some aspects, the process 400 includes determining a value of a motion vector resolution flag is equal to zero. The motion vector resolution flag specifies a resolution of motion vectors used for an inter-prediction mode. In such aspects, disabling inter-prediction bi-prediction at 408 includes disabling the inter-picture bi-prediction for encoding the one or more blocks of the video data in response to determining the intra-picture prediction is enabled, determining both motion vectors of the bi-prediction block are not identical or are not pointing to the same reference picture, and determining the value of the motion vector resolution flag is equal to zero.

In some aspects, the video data comprises a slice of a picture. The slice includes a plurality of blocks, as described above. In such aspects, disabling inter-prediction bi-prediction at 408 includes disabling the inter-picture bi-prediction for encoding the plurality of blocks of the slice. For example, inter-picture bi-prediction can be restricted for only blocks of the slice, and not for blocks of other slices of the picture. In some examples, a picture can include only a single slice. In some examples, a picture can include multiple slices.

In some aspects, the inter-picture bi-prediction is disabled for encoding prediction blocks that are less than a threshold size. In some examples, the threshold size includes a prediction block size of 8×8 pixels or any other suitable block size.

FIG. 5 illustrates an example of a process 500 of decoding video data to generate one or more decoded video pictures using one or more of the techniques described herein. At 502, the process 500 includes receiving, in a video bitstream, encoded video data encoded using a plurality of prediction modes. The plurality of prediction modes comprise an inter-picture uni-prediction mode, an inter-picture bi-prediction mode, and an intra-picture intra-block copy mode. The encoded video data can include a current picture, a current slice of a current picture, a current coding unit (e.g., a CTU, a CU, or other unit of video data being decoded), or any other video data.

At 504, the process 500 includes receiving, in the video bitstream, an indication that inter-picture bi-prediction is disabled for one or more blocks of the encoded video data. Inter-picture bi-prediction is disabled based on intra-block copy being enabled for the one or more blocks of the encoded video data and both motion vectors of a bi-prediction block of the encoded video data being in non-integer accuracy. For example, both vectors of the bi-prediction block can be determined to have fractional-pel accuracy, as described above. In some examples, IBC can be enabled for a block of the current picture, a block of the current slice, a block of a current coding unit (e.g., a CTU, a CU, or other unit of video data being decoded). In some examples, IBC can be enabled on a picture, slice, or coded video sequence (CVS) level. In some examples, the bi-prediction block with non-integer motion vectors includes an 8×8 bi-prediction block. In some examples, the bi-prediction block can include any block with a certain partition size, such as a 4×4 block, a 16×16 block, or any other suitable block.

At 506, the process 500 includes determining, based on the indication, a prediction mode from the plurality of prediction modes for predicting a block of the encoded video data. For example, the inter-picture uni-prediction mode or the intra-picture intra-block copy mode can be selected for use in decoding the encoded video data.

At 508, the process 500 includes decoding the block of the encoded video data using the determined prediction mode. For example, the encoded video data can be decoded using the inter-picture uni-prediction mode or the intra-picture intra-block copy mode.

In some examples, the inter-picture bi-prediction is disabled based on intra-block copy being enabled for the one or more blocks of the encoded video data, both motion vectors of a bi-prediction block of the encoded video data being in non-integer accuracy, and both motion vectors of the bi-prediction block not being identical or not pointing to a same reference picture.

In some examples, the inter-picture bi-prediction is disabled based on intra-block copy being enabled for the one or more blocks of the encoded video data, both motion vectors of a bi-prediction block of the encoded video data being in non-integer accuracy, and a value of a motion vector resolution flag being equal to zero, the motion vector resolution flag specifying a resolution of motion vectors used for an inter-prediction mode.

In some aspects, the encoded video data comprises a slice of a picture. The slice includes a plurality of blocks, as described above. In such aspects, the inter-prediction bi-prediction is disabled for decoding the plurality of blocks of the slice.

In some aspects, the inter-picture bi-prediction is disabled for decoding prediction blocks that are less than a threshold size. In some examples, the threshold size includes a prediction block size of 8×8 pixels or any other suitable block size.

FIG. 6 illustrates another example of a process 600 of decoding video data to generate one or more decoded video pictures using one or more of the techniques described herein. At 602, the process 600 includes receiving, in a video bitstream, encoded video data encoded using a plurality of prediction modes. The plurality of prediction modes comprise an inter-picture uni-prediction mode, an inter-picture bi-prediction mode, and an intra-picture intra-block copy mode. The encoded video data can include a current picture, a current slice of a current picture, a current coding unit (e.g., a CTU, a CU, or other unit of video data being decoded), or any other video data.

At 604, the process 600 includes receiving, in the video bitstream, an indication that inter-picture bi-prediction is disabled for one or more blocks of the encoded video data. Inter-picture bi-prediction is disabled based on intra-block copy being enabled for the one or more blocks of the encoded video data and both motion vectors of a bi-prediction block not being identical or not pointing to the same reference picture. In some examples, IBC can be enabled for a block of the current picture, a block of the current slice, a block of a current coding unit (e.g., a CTU, a CU, or other unit of video data being decoded). In some examples, IBC can be enabled on a picture, slice, or coded video sequence (CVS) level. In some examples, the bi-prediction block with non-identical motion vectors includes an 8×8 bi-prediction block. In some examples, the bi-prediction block can include any block with a certain partition size, such as a 4×4 block, a 16×16 block, or any other suitable block.

At 606, the process 600 includes determining, based on the indication, a prediction mode from the plurality of prediction modes for predicting a block of the encoded video data. For example, the inter-picture uni-prediction mode or the intra-picture intra-block copy mode can be selected for use in decoding the encoded video data.

At 608, the process 600 includes decoding the block of the encoded video data using the determined prediction mode. For example, the encoded video data can be decoded using the inter-picture uni-prediction mode or the intra-picture intra-block copy mode.

In some aspects, the inter-picture bi-prediction is disabled based on intra-block copy being enabled for the one or more blocks of the encoded video data, both motion vectors of a bi-prediction block not being identical or not pointing to the same reference picture, and both motion vectors of the bi-prediction block being in non-integer accuracy.

In some aspects, the inter-picture bi-prediction is disabled based on intra-block copy being enabled for the one or more blocks of the encoded video data, both motion vectors of a bi-prediction block not being identical or not pointing to the same reference picture, and a value of a motion vector resolution flag being equal to zero, the motion vector resolution flag specifying a resolution of motion vectors used for an inter-prediction mode.

In some aspects, the video data comprises a slice of a picture. The slice includes a plurality of blocks, as described above. In such aspects, the inter-prediction bi-prediction is disabled for decoding the plurality of blocks of the slice.

In some aspects, the inter-picture bi-prediction is disabled for decoding prediction blocks that are less than a threshold size. In some examples, the threshold size includes a prediction block size of 8×8 pixels.

In some examples, the processes 300, 400, 500, and 600 may be performed by a computing device or an apparatus, such as the system 100 shown in FIG. 1. For example, the processes 300 and 400 can be performed by the encoding device 104 shown in FIG. 1 and FIG. 7, and the processes 500 and 600 can be performed by the decoding device 112 shown in FIG. 1 and FIG. 8. In some cases, the computing device or apparatus may include a processor, microprocessor, microcomputer, or other component of a device that is configured to carry out the steps of processes 300, 400, 500, and 600. In some examples, the computing device or apparatus may include a camera configured to capture video data (e.g., a video sequence) including video frames. In some examples, a camera or other capture device that captures the video data is separate from the computing device, in which case the computing device receives or obtains the captured video data. The computing device may further include a network interface configured to communicate the video data. The network interface may be configured to communicate Internet Protocol (IP) based data or other type of data.

Processes 300, 400, 500, and 600 are illustrated as logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes 300, 400, 500, and 600 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

The coding techniques discussed herein may be implemented in an example video encoding and decoding system (e.g., system 100). In some examples, a system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and a output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above is merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device and destination device are merely examples of such coding devices in which source device generates coded video data for transmission to destination device. In some examples, the source and destination devices may operate in a substantially symmetrical manner such that each of the devices include video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer-generated video. In some cases, if video source is a video camera, source device and destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

The input interface of the destination device receives information from the computer-readable medium. The information of the computer-readable medium may include syntax information defined by the video encoder, which is also used by the video decoder, that includes syntax elements that describe characteristics and/or processing of blocks and other coded units, e.g., group of pictures (GOP). A display device displays the decoded video data to a user, and may comprise any of a variety of display devices such as a cathode ray tube (CRT), a liquid crystal display (LCD), a plasma display, an organic light emitting diode (OLED) display, or another type of display device. Various embodiments of the invention have been described.

Figure 7:
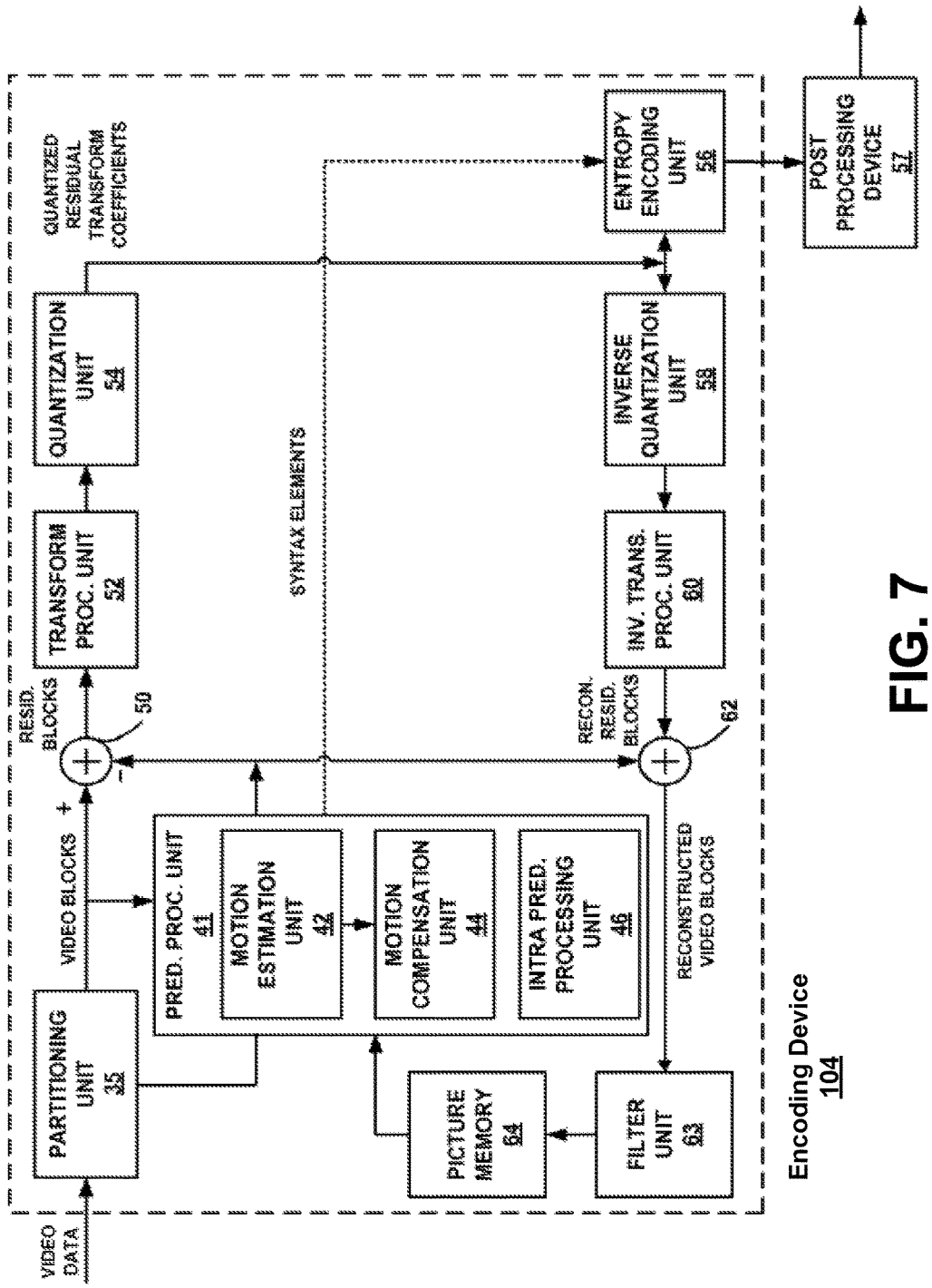
FIG. 7 is a block diagram illustrating an example video encoding device, in accordance with some embodiments.
Figure 8:
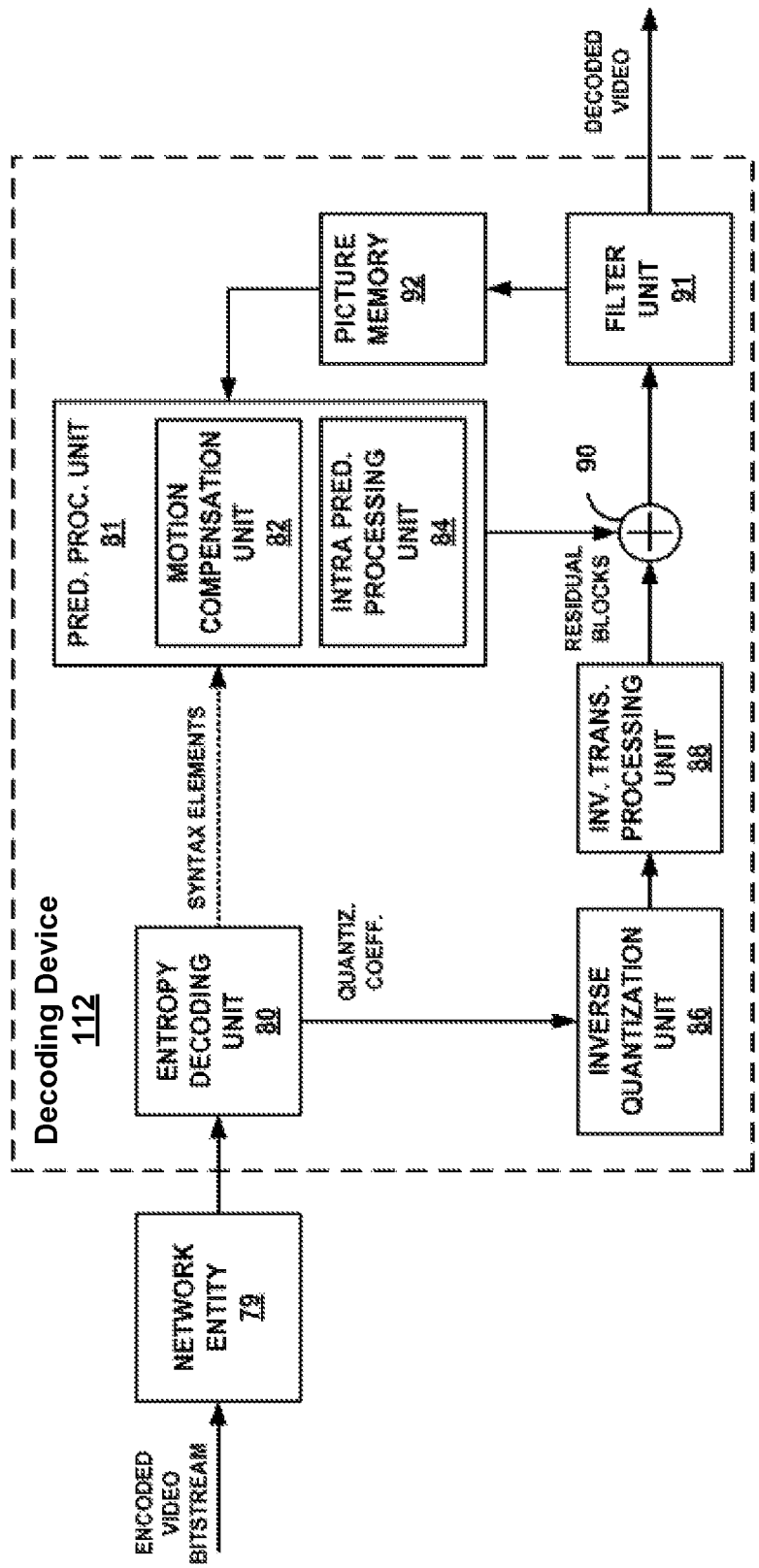
FIG. 8 is a block diagram illustrating an example video decoding device, in accordance with some embodiments.

Specific details of the encoding device 104 and the decoding device 112 are shown in FIG. 7 and FIG. 8, respectively. FIG. 7 is a block diagram illustrating an example encoding device 104 that may implement one or more of the techniques described in this disclosure. Encoding device 104 may, for example, generate the syntax structures described herein (e.g., the syntax structures of a VPS, SPS, PPS, or other syntax elements). Encoding device 104 may perform intra-prediction and inter-prediction coding of video blocks within video slices. As previously described, intra-coding relies, at least in part, on spatial prediction to reduce or remove spatial redundancy within a given video frame or picture. Inter-coding relies, at least in part, on temporal prediction to reduce or remove temporal redundancy within adjacent or surrounding frames of a video sequence. Intra-mode (I mode) may refer to any of several spatial based compression modes. Inter-modes, such as uni-directional prediction (P mode) or bi-prediction (B mode), may refer to any of several temporal-based compression modes.

The encoding device 104 includes a partitioning unit 35, prediction processing unit 41, filter unit 63, picture memory 64, summer 50, transform processing unit 52, quantization unit 54, and entropy encoding unit 56. Prediction processing unit 41 includes motion estimation unit 42, motion compensation unit 44, and intra-prediction processing unit 46. For video block reconstruction, encoding device 104 also includes inverse quantization unit 58, inverse transform processing unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 7 as being an in loop filter, in other configurations, filter unit 63 may be implemented as a post loop filter. A post processing device 57 may perform additional processing on encoded video data generated by the encoding device 104. The techniques of this disclosure may in some instances be implemented by the encoding device 104. In other instances, however, one or more of the techniques of this disclosure may be implemented by post processing device 57.

As shown in FIG. 7, the encoding device 104 receives video data, and partitioning unit 35 partitions the data into video blocks. The partitioning may also include partitioning into slices, slice segments, tiles, or other larger units, as wells as video block partitioning, e.g., according to a quadtree structure of LCUs and CUs. The encoding device 104 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra-prediction coding modes or one of a plurality of inter-prediction coding modes, for the current video block based on error results (e.g., coding rate and the level of distortion, or the like). Prediction processing unit 41 may provide the resulting intra- or inter-coded block to summer 50 to generate residual block data and to summer 62 to reconstruct the encoded block for use as a reference picture.

Intra-prediction processing unit 46 within prediction processing unit 41 may perform intra-prediction coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices, or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a prediction unit (PU) of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, the encoding device 104 may calculate values for sub-integer pixel positions of reference pictures stored in picture memory 64. For example, the encoding device 104 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in picture memory 64.

Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in a reference picture list. The encoding device 104 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by the decoding device 112 in decoding the video blocks of the video slice.

Intra-prediction processing unit 46 may intra-predict a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction unit processing 46 (or mode select unit 40, in some examples) may select an appropriate intra-prediction mode to use from the tested modes. For example, intra-prediction processing unit 46 may calculate rate-distortion values using a rate-distortion analysis for the various tested intra-prediction modes, and may select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode. The encoding device 104 may include in the transmitted bitstream configuration data definitions of encoding contexts for various blocks as well as indications of a most probable intra-prediction mode, an intra-prediction mode index table, and a modified intra-prediction mode index table to use for each of the contexts. The bitstream configuration data may include a plurality of intra-prediction mode index tables and a plurality of modified intra-prediction mode index tables (also referred to as codeword mapping tables).

After prediction processing unit 41 generates the predictive block for the current video block via either inter-prediction or intra-prediction, the encoding device 104 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding technique. Following the entropy encoding by entropy encoding unit 56, the encoded bitstream may be transmitted to the decoding device 112, or archived for later transmission or retrieval by the decoding device 112. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within a reference picture list. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in picture memory 64. The reference block may be used by motion estimation unit 42 and motion compensation unit 44 as a reference block to inter-predict a block in a subsequent video frame or picture.

In this manner, the encoding device 104 of FIG. 7 represents an example of a video encoder configured to generate syntax for a encoded video bitstream. The encoding device 104 may, for example, generate VPS, SPS, and PPS parameter sets as described above. The encoding device 104 may perform any of the techniques described herein, including the processes described above with respect to FIG. 3 and FIG. 4. The techniques of this disclosure have generally been described with respect to the encoding device 104, but as mentioned above, some of the techniques of this disclosure may also be implemented by post processing device 57.

FIG. 8 is a block diagram illustrating an example decoding device 112. The decoding device 112 includes an entropy decoding unit 80, prediction processing unit 81, inverse quantization unit 86, inverse transform processing unit 88, summer 90, filter unit 91, and picture memory 92. Prediction processing unit 81 includes motion compensation unit 82 and intra prediction processing unit 84. The decoding device 112 may, in some examples, perform a decoding pass generally reciprocal to the encoding pass described with respect to the encoding device 104 from FIG. 7. The decoding device 112 may perform any of the techniques described herein, including the processes described above with respect to FIG. 5 and FIG. 6.

During the decoding process, the decoding device 112 receives an encoded video bitstream that represents video blocks of an encoded video slice and associated syntax elements sent by the encoding device 104. In some embodiments, the decoding device 112 may receive the encoded video bitstream from the encoding device 104. In some embodiments, the decoding device 112 may receive the encoded video bitstream from a network entity 79, such as a server, a media-aware network element (MANE), a video editor/splicer, or other such device configured to implement one or more of the techniques described above. Network entity 79 may or may not include the encoding device 104. Some of the techniques described in this disclosure may be implemented by network entity 79 prior to network entity 79 transmitting the encoded video bitstream to the decoding device 112. In some video decoding systems, network entity 79 and the decoding device 112 may be parts of separate devices, while in other instances, the functionality described with respect to network entity 79 may be performed by the same device that comprises the decoding device 112.

The entropy decoding unit 80 of the decoding device 112 entropy decodes the bitstream to generate quantized coefficients, motion vectors, and other syntax elements. Entropy decoding unit 80 forwards the motion vectors and other syntax elements to prediction processing unit 81. The decoding device 112 may receive the syntax elements at the video slice level and/or the video block level. Entropy decoding unit 80 may process and parse both fixed-length syntax elements and variable-length syntax elements in or more parameter sets, such as a VPS, SPS, and PPS.

When the video slice is coded as an intra-coded (I) slice, intra prediction processing unit 84 of prediction processing unit 81 may generate prediction data for a video block of the current video slice based on a signaled intra-prediction mode and data from previously decoded blocks of the current frame or picture. When the video frame is coded as an inter-coded (i.e., B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within a reference picture list. The decoding device 112 may construct the reference frame lists, List 0 and List 1, using default construction techniques based on reference pictures stored in picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 may use one or more syntax elements in a parameter set to determine a prediction mode (e.g., intra- or inter-prediction) used to code the video blocks of the video slice, an inter-prediction slice type (e.g., B slice, P slice, or GPB slice), construction information for one or more reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by the encoding device 104 during encoding of the video blocks to calculate interpolated values for sub-integer pixels of reference blocks. In this case, motion compensation unit 82 may determine the interpolation filters used by the encoding device 104 from the received syntax elements, and may use the interpolation filters to produce predictive blocks.

Inverse quantization unit 86 inverse quantizes, or de-quantizes, the quantized transform coefficients provided in the bitstream and decoded by entropy decoding unit 80. The inverse quantization process may include use of a quantization parameter calculated by the encoding device 104 for each video block in the video slice to determine a degree of quantization and, likewise, a degree of inverse quantization that should be applied. Inverse transform processing unit 88 applies an inverse transform (e.g., an inverse DCT or other suitable inverse transform), an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, the decoding device 112 forms a decoded video block by summing the residual blocks from inverse transform processing unit 88 with the corresponding predictive blocks generated by motion compensation unit 82. Summer 90 represents the component or components that perform this summation operation. If desired, loop filters (either in the coding loop or after the coding loop) may also be used to smooth pixel transitions, or to otherwise improve the video quality. Filter unit 91 is intended to represent one or more loop filters such as a deblocking filter, an adaptive loop filter (ALF), and a sample adaptive offset (SAO) filter. Although filter unit 91 is shown in FIG. 8 as being an in loop filter, in other configurations, filter unit 91 may be implemented as a post loop filter. The decoded video blocks in a given frame or picture are then stored in picture memory 92, which stores reference pictures used for subsequent motion compensation. Picture memory 92 also stores decoded video for later presentation on a display device, such as video destination device 122 shown in FIG. 1.

In the foregoing description, aspects of the application are described with reference to specific embodiments thereof, but those skilled in the art will recognize that the invention is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

What is claimed is:

1. A method of encoding video data to generate one or more encoded video pictures, the method comprising:
   obtaining video data at an encoder, the video data including one or more of a picture, a slice of the picture, or a coding unit of the picture;
   determining that intra-block copy prediction is enabled for performing intra-picture prediction a first block from the picture;
   determining that a second block from the picture was predicted with inter-picture bi-prediction, wherein the inter-picture bi-prediction resulted in both motion vectors of the second block having non-integer accuracy;
   disabling inter-picture bi-prediction for encoding a subset of blocks in a search area of the picture, wherein the intra-block copy prediction uses the search area to find a prediction block for the first block, wherein the inter-picture bi-prediction is disabled in response to determining that the intra-block copy prediction is enabled for the first block and determining that both motion vectors of the second block have non-integer accuracy, and wherein the inter-picture bi-prediction remains enabled for blocks in the search area other than the subset of blocks and for blocks outside the search area; and
   generating the one or more encoded video pictures with intra-block copy prediction enabled and inter-picture bi-predication disabled for the subset of blocks in the search area.

2. The method of claim 1, further comprising:
   determining that motion vectors of at least one bi-prediction block of the video data are not identical or are not pointing to a same reference picture, wherein disabling the inter-picture bi-prediction for encoding the subset of blocks in the search area is further in response to determining that both motion vectors of the at least one bi-prediction block are not identical or are not pointing to the same reference picture.

3. The method of claim 1, further comprising:
   determining that a value of a motion vector resolution flag is equal to zero, the motion vector resolution flag specifying a resolution of motion vectors used for an inter-prediction mode, wherein disabling the inter-picture bi-prediction for encoding the subset of blocks in the search area is further in response to determining that the value of the motion vector resolution flag is equal to zero.

4. The method of claim 1, wherein the slice of the picture includes a plurality of blocks, and wherein disabling includes disabling the inter-picture bi-prediction for encoding the plurality of blocks of the slice.

5. The method of claim 1, wherein the second block is an 8×8 bi-prediction block.

6. The method of claim 1, wherein the inter-picture bi-prediction is disabled for encoding prediction blocks that are less than a threshold size.

7. The method of claim 6, wherein the threshold size includes a prediction block size of 8×8 pixels.

8. An apparatus comprising:
a memory configured to store video data; and
a processor configured to:
obtain the video data at an encoder, the video data including one or more of a picture, a slice of the picture, or a coding unit of the picture;
determine that intra-block copy prediction is enabled for performing intra-picture prediction a first block from the picture;
determine that a second block from the picture was predicted with inter-picture bi-prediction, wherein the inter-picture bi-prediction resulted in both motion vectors of the second block having non-integer accuracy;
disable inter-picture bi-prediction for encoding a subset of blocks in a search area of the picture, wherein the intra-block copy prediction uses the search area to find a prediction block for the first block, wherein the inter-picture bi-prediction is disabled in response to determining that the intra-block copy prediction is enabled for the first block and determining that both motion vectors of the second block have non-integer accuracy, and wherein the inter-picture bi-prediction remains enabled for blocks in the search area other than the subset of blocks and for blocks outside the search area; and
generate one or more encoded video pictures with intra-block copy prediction enabled and inter-picture bi-prediction disabled for the subset of blocks in the search area.

9. The apparatus of claim 8, wherein the processor is further configured to:
determine that motion vectors of at least one bi-prediction block of the video data are not identical or are not pointing to a same reference picture, wherein disabling the inter-picture bi-prediction for encoding the subset of blocks in the search area is further in response to determining that both motion vectors of the at least one bi-prediction block are not identical or are not pointing to the same reference picture.

10. The apparatus of claim 8, wherein the processor is further configured to:
determine that a value of a motion vector resolution flag is equal to zero, the motion vector resolution flag specifying a resolution of motion vectors used for an inter-prediction mode, wherein disabling the inter-picture bi-prediction for encoding the subset of blocks in the search area is further in response to determining that the value of the motion vector resolution flag is equal to zero.

11. The apparatus of claim 8, wherein the slice of the picture includes a plurality of blocks, and wherein disabling includes disabling the inter-picture bi-prediction for encoding the plurality of blocks of the slice.

12. The apparatus of claim 8, wherein the second block is an 8×8 bi-prediction block.

13. The apparatus of claim 8, wherein the inter-picture bi-prediction is disabled for encoding prediction blocks that are less than a threshold size.

14. The apparatus of claim 13, wherein the threshold size includes a prediction block size of 8×8 pixels.

15. A non-transitory computer readable medium having stored thereon instructions that when executed by a processor cause the processor to perform operations including:
obtaining video data at an encoder, the video data including one or more of a picture, a slice of the picture, or a coding unit of the picture;
determining that intra-block copy prediction is enabled for performing intra-picture prediction on a first block from the picture;
determining that a second block from the picture was predicted with inter-picture bi-prediction, wherein the inter-picture bi-prediction resulted in both motion vectors of the second block having non-integer accuracy;
disabling inter-picture bi-prediction for encoding a subset of blocks in a search area of the picture, wherein the intra-block copy prediction uses the search area to find a prediction block for the first block, wherein the inter-picture bi-prediction is disabled in response to determining that the intra-block copy prediction is enabled for the first block and determining both motion vectors of the second block have non-integer accuracy and wherein the inter-picture bi-prediction remains enabled for blocks in the search area other than the subset of blocks and for blocks outside the search area; and
generating one or more encoded video pictures with intra-block copy prediction enabled and inter-picture bi-prediction disabled for the subset of blocks in the search area.

16. The non-transitory computer readable medium of claim 15, further comprising instructions that, when executed by a processor, cause the processor to perform operations including:
determining that motion vectors of at least one bi-prediction block of the video data are not identical or are not pointing to a same reference picture, wherein disabling the inter-picture bi-prediction for encoding the subset of blocks in the search area is further in response to determining that both motion vectors of the at least one bi-prediction block are not identical or are not pointing to the same reference picture.

17. The non-transitory computer readable medium of claim 15, further comprising instructions that, when executed by a processor, cause the processor to perform operations including:
determining that a value of a motion vector resolution flag is equal to zero, the motion vector resolution flag specifying a resolution of motion vectors used for an inter-prediction mode, wherein disabling the inter-picture bi-prediction for encoding the subset of blocks in the search area is further in response to determining that the value of the motion vector resolution flag is equal to zero.

18. The non-transitory computer readable medium of claim 15, wherein the slice of the picture includes a plurality of blocks, and wherein disabling includes disabling the inter-picture bi-prediction for encoding the plurality of blocks of the slice.

19. The non-transitory computer readable medium of claim 15, wherein the second block is an 8×8 bi-prediction block.

20. The non-transitory computer readable medium of claim 15, wherein the inter-picture bi-prediction is disabled for encoding prediction blocks that are less than a threshold size.

21. The non-transitory computer readable medium of claim 20, wherein the threshold size includes a prediction block size of 8×8 pixels.

22. A method of encoding video data to generate one or more encoded video pictures, the method comprising:
obtaining video data at an encoder, the video data including one or more of a picture, a slice of the picture, or a coding unit of the picture;

determining that intra-block copy prediction is enabled for performing intra-picture prediction on a first block from the picture;

determining that a second block from the picture was predicted with inter-picture bi-prediction, wherein the inter-picture bi-prediction resulted in motion vectors of the second block being not identical or not pointing to a same reference picture;

disabling inter-picture bi-prediction for encoding a subset of blocks in a search area of the picture, wherein the intra-block copy prediction uses the search area to find a prediction block for the first block, wherein the inter-picture bi-prediction is disabled in response to determining that the intra-block copy prediction is enabled for the first block and determining that the motion vectors of the second block are not identical or are not pointing to the same reference picture, and wherein the inter-picture bi-prediction remains enabled for blocks in the search area other than the subset of blocks and for blocks outside the search area; and generating the one or more encoded video pictures with intra-block copy prediction enabled and inter-picture bi-prediction disabled for the subset of blocks in the search area.

23. The method of claim 22, further comprising:

determining that both motion vectors of at least one bi-prediction block of the video data are in non-integer accuracy, wherein disabling the inter-picture bi-prediction for encoding the subset of blocks in the search area is further in response to determining that both motion vectors of the at least one bi-prediction block are in non-integer accuracy.

24. The method of claim 22, further comprising:

determining a value of a motion vector resolution flag is equal to zero, the motion vector resolution flag specifying a resolution of motion vectors used for an inter-prediction mode, wherein disabling the inter-picture bi-prediction for encoding the subset of blocks in the search area is further in response to determining that the value of the motion vector resolution flag is equal to zero.

25. The method of claim 22, the slice of the picture includes a plurality of blocks, and wherein disabling includes disabling the inter-picture bi-prediction for encoding the plurality of blocks of the slice.

26. The method of claim 22, wherein the second block is an 8×8 bi-prediction block.

27. The method of claim 22, wherein the inter-picture bi-prediction is disabled for encoding prediction blocks that are less than a threshold size.

28. The method of claim 27, wherein the threshold size includes a prediction block size of 8×8 pixels.

29. An apparatus comprising:

a memory configured to store video data; and
a processor configured to:
  obtain the video data at an encoder, the video data including one or more of a picture, a slice of the picture, or a coding unit of the picture;
  determine that intra-block copy prediction is enabled for performing intra-picture prediction on a first block from the picture;
  determine that a second block from the picture was predicted with inter-picture bi-prediction, wherein the inter-picture bi-prediction resulted in motion vectors of the second block being not identical or not pointing to a same reference picture;
  disable inter-picture bi-prediction for encoding a subset of blocks in a search area of the picture, wherein the intra-block copy prediction uses the search area to find a prediction block for the first block, wherein the inter-picture bi-prediction is disabled in response to determining that the intra-block copy prediction is enabled for the first block and determining that both motion vectors of the second block have non-integer accuracy, and wherein the inter-picture bi-prediction remains enabled for blocks in the search area other than the subset of blocks and for blocks outside the search area; and
  generate one or more encoded video pictures with intra-block copy prediction enabled and inter-picture bi-predication disabled for the subset of blocks in the search area.

30. The apparatus of claim 29, wherein the processor is further configured to:

determine that both motion vectors of at least one bi-prediction block of the video data are in non-integer accuracy, wherein disabling the inter-picture bi-prediction for encoding the subset of blocks in the search area is further in response to determining that both motion vectors of the at least one bi-prediction block are in non-integer accuracy.

31. The apparatus of claim 29, wherein the processor is further configured to:

determine a value of a motion vector resolution flag is equal to zero, the motion vector resolution flag specifying a resolution of motion vectors used for an inter-prediction mode, wherein disabling the inter-picture bi-prediction for encoding the subset of blocks in the search area is further in response to determining that the value of the motion vector resolution flag is equal to zero.

32. The apparatus of claim 29, wherein the slice of the picture includes a plurality of blocks, and wherein disabling includes disabling the inter-picture bi-prediction for encoding the plurality of blocks of the slice.

33. The apparatus of claim 29, wherein the second block is an 8×8 bi-prediction block.

34. The apparatus of claim 29, wherein the inter-picture bi-prediction is disabled for encoding prediction blocks that are less than a threshold size.

35. The apparatus of claim 34, wherein the threshold size includes a prediction block size of 8×8 pixels.

36. A non-transitory computer readable medium having stored thereon instructions that when executed by a processor cause the processor to perform operations including:

obtaining video data at an encoder, the video data including one or more of a picture, a slice of the picture, or a coding unit of the picture;

determining that intra-block copy prediction is enabled for performing intra-picture prediction on a first block from the picture;

determining that a second block from the picture was predicted with inter-picture bi-prediction, wherein the inter-picture bi-prediction resulted in motion vectors of the second block being not identical or not pointing to a same reference picture;

disabling inter-picture bi-prediction for encoding a subset of blocks in a search area of the picture, wherein the intra-block copy prediction uses the search area to find a prediction block for the first block, wherein the inter-picture bi-prediction is disabled in response to determining that the intra-block copy prediction is enabled for the first block and determining that both motion vectors of the second block have non-integer accuracy, and wherein the inter-picture bi-prediction remains enabled for blocks in the search area other than the subset of blocks and for blocks outside the search area; and generating one or more encoded video pictures with intra-block copy prediction enabled and inter-picture bi-predication disabled for the subset of blocks in the search area.

37. The non-transitory computer readable medium of claim 36, further comprising instructions that, when executed by a processor, cause the processor to perform operations including:

determining that both motion vectors of at least one bi-prediction block of the video data are in non-integer accuracy, wherein disabling the inter-picture bi-prediction for encoding the subset of blocks in the search area is further in response to determining that both motion vectors of the at least one bi-prediction block are in non-integer accuracy.

38. The non-transitory computer readable medium of claim 36, further comprising instructions that, when executed by a processor, cause the processor to perform operations including:

determining a value of a motion vector resolution flag is equal to zero, the motion vector resolution flag specifying a resolution of motion vectors used for an inter-prediction mode, wherein disabling the inter-picture bi-prediction for encoding the subset of blocks in the search area is in further response to determining that the value of the motion vector resolution flag is equal to zero.

39. The non-transitory computer readable medium of claim 36, wherein the slice of the picture includes a plurality of blocks, and wherein disabling includes disabling the inter-picture bi-prediction for encoding the plurality of blocks of the slice.

40. The non-transitory computer readable medium of claim 36, wherein the second block is an 8×8 bi-prediction block.

41. The non-transitory computer readable medium of claim 36, wherein the inter-picture bi-prediction is disabled for encoding prediction blocks that are less than a threshold size.

42. The non-transitory computer readable medium of claim 41, wherein the threshold size includes a prediction block size of 8×8 pixels.

* * * * *